United States Patent
Standefer, III et al.

(10) Patent No.: US 10,402,408 B2
(45) Date of Patent: Sep. 3, 2019

(54) VERSIONING OF INFERRED DATA IN AN ENRICHED ISOLATED COLLECTION OF RESOURCES AND RELATIONSHIPS

(71) Applicant: Microsoft Technology Licensing, LLC, Redmond, WA (US)

(72) Inventors: Robert Standefer, III, Duvall, WA (US); Christopher L. Mullins, Sammamish, WA (US); John A. Taylor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 15/344,259

(22) Filed: Nov. 4, 2016

(65) Prior Publication Data

US 2018/0129715 A1    May 10, 2018

(51) Int. Cl.
*G06F 16/24* (2019.01)
*G06F 16/2457* (2019.01)
(Continued)

(52) U.S. Cl.
CPC .... *G06F 16/24575* (2019.01); *G06F 16/2453* (2019.01); *G06F 16/24564* (2019.01); *G06F 16/9535* (2019.01)

(58) Field of Classification Search
None
See application file for complete search history.

(56) References Cited

U.S. PATENT DOCUMENTS

| 5,721,943 A | 2/1998 | Johnson |
| 6,560,592 B1 | 5/2003 | Reid et al. |
| (Continued) | | |

FOREIGN PATENT DOCUMENTS

| CN | 103714129 | 4/2014 |
| EP | 1681645 | 7/2006 |
| (Continued) | | |

OTHER PUBLICATIONS

"File Versioning Rules", http://web.archive.org/web/20111004024745/http:/msdn.microsoft.com/en-us/library/windows/desktop/aa368599(v=VS.85).aspx, Oct. 4, 2011, 2 pages.
(Continued)

*Primary Examiner* — Jau Shya Meng

(57) ABSTRACT

Systems and methods that control versioning of inferred data in isolated collections representing resources and relationships between those resources. Multiple versions of rulesets may be received or accessed. Execution of each ruleset generates inferred data, such as inferred relationships between resources represented in the isolated collection. A version identifier may be incorporated into each inferred relationship or other inferred data. The version identifier indicates the particular version of a ruleset that resulted in the creation of the corresponding inferred relationship. Upon receiving a query for data in the isolated collection, the query is parsed to determine a query version identifier. Based on the query version identifier, results to the query may be filtered to include inferred data resulting only from a particular version of a ruleset. The results may be displayed as a graph with nodes representing resources and edges representing relationships.

20 Claims, 20 Drawing Sheets

(51) Int. Cl.
   *G06F 16/9535* (2019.01)
   *G06F 16/2455* (2019.01)
   *G06F 16/2453* (2019.01)

(56) References Cited

U.S. PATENT DOCUMENTS

| | | | |
|---|---|---|---|
| 6,947,943 | B2 | 9/2005 | Deanna et al. |
| 7,016,880 | B1 | 3/2006 | Adams et al. |
| 7,068,849 | B2 | 6/2006 | Zandi et al. |
| 7,069,335 | B1 | 6/2006 | Layman et al. |
| 7,418,497 | B2 | 8/2008 | Hagale et al. |
| 7,668,834 | B2 | 2/2010 | McCullough |
| 7,702,603 | B1 | 4/2010 | Hauser |
| 8,001,551 | B2 | 8/2011 | Le Roy et al. |
| 8,112,377 | B2 | 2/2012 | Schmidt |
| 8,140,362 | B2 | 3/2012 | Deshpande et al. |
| 8,185,558 | B1 | 5/2012 | Narayanan et al. |
| 8,428,981 | B2 | 4/2013 | Li et al. |
| 8,429,179 | B1 | 4/2013 | Mirhaji |
| 8,443,005 | B1 | 5/2013 | Goldman et al. |
| 8,620,964 | B2 | 12/2013 | Tsatsou et al. |
| 8,739,016 | B1 | 5/2014 | Goldman et al. |
| 8,788,330 | B2 | 7/2014 | Leffert |
| 8,825,711 | B2 | 9/2014 | Chan et al. |
| 8,838,707 | B2 | 9/2014 | Lawson et al. |
| 9,075,873 | B2 | 7/2015 | Vanderwende et al. |
| 9,087,236 | B2 | 7/2015 | Dhoolia et al. |
| 9,301,016 | B2 | 3/2016 | Archibong et al. |
| 9,317,557 | B2 | 4/2016 | Shao et al. |
| 9,336,306 | B2 | 5/2016 | McAteer et al. |
| 9,342,622 | B2 | 5/2016 | Segaran |
| 9,348,880 | B1 | 5/2016 | Kramer et al. |
| 9,367,809 | B2 | 6/2016 | Puri et al. |
| 9,396,046 | B2 | 7/2016 | Laredo et al. |
| 9,400,822 | B2 | 7/2016 | Schrock et al. |
| 2002/0123956 | A1 | 9/2002 | Galuten |
| 2003/0217033 | A1 | 11/2003 | Sandler et al. |
| 2003/0217081 | A1 | 11/2003 | White et al. |
| 2005/0193361 | A1 | 9/2005 | Vitanov et al. |
| 2005/0276479 | A1 | 12/2005 | Goldberg et al. |
| 2005/0278354 | A1 | 12/2005 | Gupta et al. |
| 2006/0155725 | A1 | 7/2006 | Foster et al. |
| 2007/0179995 | A1 | 8/2007 | Prahlad et al. |
| 2007/0282711 | A1 | 12/2007 | Ullman et al. |
| 2008/0082466 | A1* | 4/2008 | Meijer ............... G06N 99/005 706/12 |
| 2008/0140602 | A1 | 6/2008 | Roth et al. |
| 2008/0178164 | A1 | 7/2008 | Brown et al. |
| 2008/0307337 | A1 | 12/2008 | Marinkovich et al. |
| 2009/0024648 | A1 | 1/2009 | Heix et al. |
| 2009/0063559 | A1 | 3/2009 | Rhodes et al. |
| 2009/0070299 | A1* | 3/2009 | Parikh ............... G06F 17/30693 |
| 2009/0089265 | A1 | 4/2009 | Saito et al. |
| 2009/0187517 | A1* | 7/2009 | Mihalkova ........ G06F 17/30539 706/12 |
| 2009/0259944 | A1 | 10/2009 | Wu |
| 2010/0023481 | A1* | 1/2010 | McGoveran ...... G06F 17/30595 707/E17.005 |
| 2010/0030725 | A1 | 2/2010 | Mendis et al. |
| 2010/0036788 | A1 | 2/2010 | Wu et al. |
| 2010/0082646 | A1 | 4/2010 | Meek et al. |
| 2010/0223223 | A1 | 9/2010 | Sandler et al. |
| 2010/0318488 | A1 | 12/2010 | Oliver et al. |
| 2012/0185826 | A1 | 7/2012 | Wheeler et al. |
| 2013/0117185 | A1 | 5/2013 | Collison et al. |
| 2013/0238667 | A1 | 9/2013 | Carvalho et al. |
| 2013/0246435 | A1 | 9/2013 | Yan et al. |
| 2014/0046981 | A1 | 2/2014 | Adams et al. |
| 2014/0067850 | A1 | 3/2014 | Schrock et al. |
| 2014/0129504 | A1 | 5/2014 | Soon-shiong |
| 2014/0164298 | A1 | 6/2014 | Goranson et al. |
| 2014/0172914 | A1 | 6/2014 | Elnikety et al. |
| 2014/0330594 | A1 | 11/2014 | Roberts et al. |
| 2014/0337373 | A1 | 11/2014 | Morsi et al. |
| 2015/0072653 | A1 | 3/2015 | Fan et al. |
| 2015/0128121 | A1 | 5/2015 | Garcia |
| 2015/0242186 | A1 | 8/2015 | Yuen et al. |
| 2015/0280999 | A1 | 10/2015 | Chart et al. |
| 2015/0379409 | A1 | 12/2015 | Hu et al. |
| 2016/0055423 | A1* | 2/2016 | Buchanan ............. G06N 7/005 706/12 |
| 2016/0077920 | A1 | 3/2016 | Regni et al. |
| 2016/0149953 | A1 | 5/2016 | Hidayat |
| 2016/0224674 | A1 | 8/2016 | Miller et al. |
| 2016/0275347 | A1 | 9/2016 | Sukhodolov et al. |
| 2016/0301766 | A1 | 10/2016 | Ionescu et al. |
| 2017/0097984 | A1 | 4/2017 | Haldar |
| 2018/0129546 | A1 | 5/2018 | Mullins et al. |
| 2018/0129695 | A1 | 5/2018 | Standefer et al. |
| 2018/0129697 | A1 | 5/2018 | Mullins et al. |
| 2018/0129751 | A1 | 5/2018 | Mullins et al. |
| 2018/0129951 | A1 | 5/2018 | Standefer et al. |

FOREIGN PATENT DOCUMENTS

| | | |
|---|---|---|
| WO | 175679 | 10/2001 |
| WO | 2007048432 | 5/2007 |

OTHER PUBLICATIONS

"Keeping previous versions installed when installing CC 2015 applications", https://blog.adobe.com/creativecloud/keeping-previous-versions-installed-when-installing-cc-2015-applications/, Jun. 15, 2015, 2 pages.

"Receiving API Updates in Real Time with Webhooks", https://developers.facebook.com/docs/graph-api/webhooks, Oct. 12, 2016, 8 pages.

"Subscribe for webhooks to get change notifications", https://msdn.microsoft.com/en-us/office/office365/howto/onenote-sync, May 30, 2016, 3 pages.

"Webhooks", http://web.archive.org/web/20150207190001/https:/developer.github.com/webhooks/, Feb. 7, 2015, 5 pages.

asp.net Dynamic Data, https://web.archive.org/web/20100421030207/http:/msdn.microsoft.com/en-us/library/ee845452.aspx, Apr. 21, 2010, 7 pages.

Croitoru, et al., "A Conceptual Graph Based Approach to Ontology Similarity Measure", In Proceedings of 15th International Conference on Conceptual Structures, Jul. 22, 2007, 154-164 pages.

Dynamic model: adding new properties to virtual member manager entities at runtime, http://www.ibm.com/support/knowledgecenter/SSAW57_7.0.0/com.ibm.websphere.wim.doc/dynamicmodeladding newpropertiestowimentitiesatruntime.html, Oct. 14, 2016, 2 pages.

Dynamic\ user extensible entities using entity framework, http://stackoverflow.com/questions/15019705/dynamic-user-extensible-entities-using-entity-framework, Retrieved on: Oct. 14, 2016, 4 pages.

Ead, Stephen, "Proof-Theoretic Validity", In Journal of Foundations of Logical Consequence, Apr. 16, 2012, 22 pages.

Gao, et al., "Ontology-Based Semantic Similarity: A New Approach Based on Analysis of the Concept Intent", In Proceedings of the International Conference on Machine Learning and Cybernetics, Jul. 14, 2013, pp. 676-681.

Gasse, et al., "Rewriting Rules into SROIQ Axioms", In Proceedings of 21st International Workshop on Description Logics, May 13, 2008, 10 pages.

Goedtel, et al., "Azure Automation webhooks", https://azure.microsoft.com/en-us/documentation/articles/automation-webhooks/, Sep. 12, 2016, 12 pages.

Hu, et al., "GMO: A Graph Matching for Ontologies", In Proceedings of the K-CAP Workshop on Integrating Ontologies, Oct. 2, 2005, 8 pages.

Irani, Romin, "How to Integrate Webhooks with the Slack API", http://www.programmableweb.com/news/how-to-integrate-webhooks-slack-api/how-to/2015/10/20, 2015, Oct. 20, 2015, 8 pages.

Leggetter, Phil, "What are WebHooks and How Do They Enable a Real-time Web?", http://www.programmableweb.com/news/what-are-webhooks-and-how-do-they-enable-real-time-web/2012/01/30, Jan. 30, 2012, 5 pages.

(56) References Cited

OTHER PUBLICATIONS

Malihi, Ardy, "Entity Framework Dynamic Model Builder", https://github.com/ardymalihi/Dynamix-EntityFramework, Oct. 14, 2016, 3 pages.

Nielsen, Henrik F, "Introducing Microsoft asp.net WebHooks Preview", https://blogs.msdn.microsoft.com/webdev/2015/09/04/introducing-microsoft-asp-net-webhooks-preview/, Sep. 4, 2015, 17 pages.

Omelayenko, et al., "Tracking Changes in RDF(S) Repositories", In Proceedings of the Workshop on Knowledge Transformation for the Semantic Web, Jul. 23, 2012, 121 pages.

Pujara, et al., "Ontology-Aware Partitioning for Knowledge Graph Identification", In Proceedings of the workshop on automated knowledge base construction, Oct. 27, 2013, 5 pages.

Sumurthy, et al., "Working with Webhooks in Microsoft Graph", Oct. 12, 2016, 4 pages.

Thornber, K. K., "A Key to Fuzzy-Logic Inference", In International Journal of Approximate Reasoning, Feb. 1993, pp. 105-121.

Vanderlyn, et al., "Similarity in Semantic Graphs: Combining Structural, Literal, and Ontology-based Measures", In Proceedings of Tenth International Conference on Semantic Technology for Intelligence, Defense, and Security, Nov. 18, 2015, pp. 1-8.

Vega, Diego, "Support for "dynamic" entity models", https://github.com/aspnet/EntityFramework/issues/2282, May 28, 2015, 3 pages.

Zhang, et al., "Semantic similarity between ontologies at different scales", In Proceedings of IEEE/CAA Journal of Automatica Sinica, vol. 3, Issue 2, Apr. 10, 2016, pp. 132-140.

"Non Final Office Action Issued in U.S. Appl. No. 15/344,109", dated Oct. 4, 2018, 17 Pages.

"International Search Report and Written Opinion Issued in PCT Application No. PCT/US17/059626", dated May 28, 2018, 16 pages.

"Invitation to Pay Additional Fee Issued in PCT Application No. PCT/US17/059626", dated Apr. 3, 2018, 10 Pages.

PCT International Search Report and Written Opinion Issued in Application No. PCT/US2017/059621, dated Jan. 16, 2018, 11 Pages.

Jorge, et al., "Post-Processing Operators for Browsing Large Sets of Association Rules", In Proceedings of the 5th Int'l. Conference on Discovery Science, Nov. 24, 2002, 4 pages.

PCT International Search Report and Written Opinion Issued in Application No. PCT/US2017/059629, dated Dec. 22, 2017, 14 Pages.

Saygin et al., "Association Rules for Supporting Hoarding in Mobile Computing Environments", In Proceedings of Tenth International Workshop on Research Issues in Data Engineering, Feb. 29, 2000, 2 pages.

Wing, et al., "Smart Retrieval and Sharing of Information Resources Based on Contexts of User-Information Relationships",In the Proceedings of the 19th International Conference on Advanced Information Networking and Applications(AINA), vol. 2, Mar. 25, 2005, 6 Pages.

"Non Final Office Action Issued in U.S. Appl. No. 15/343,815", dated Dec. 27, 2018, 12 Pages.

"Non Final Office Action Issued in U.S. Appl. No. 15/344,336", dated Jan. 28, 2019, 31 Pages.

"Non Final Office Action Issued in U.S. Appl. No. 15/344,027", dated Jun. 27, 2019, 35 Pages.

"Non Final Office Action Issued in U.S. Appl. No. 15/344,405", dated May 8, 2019, 21 Pages.

* cited by examiner

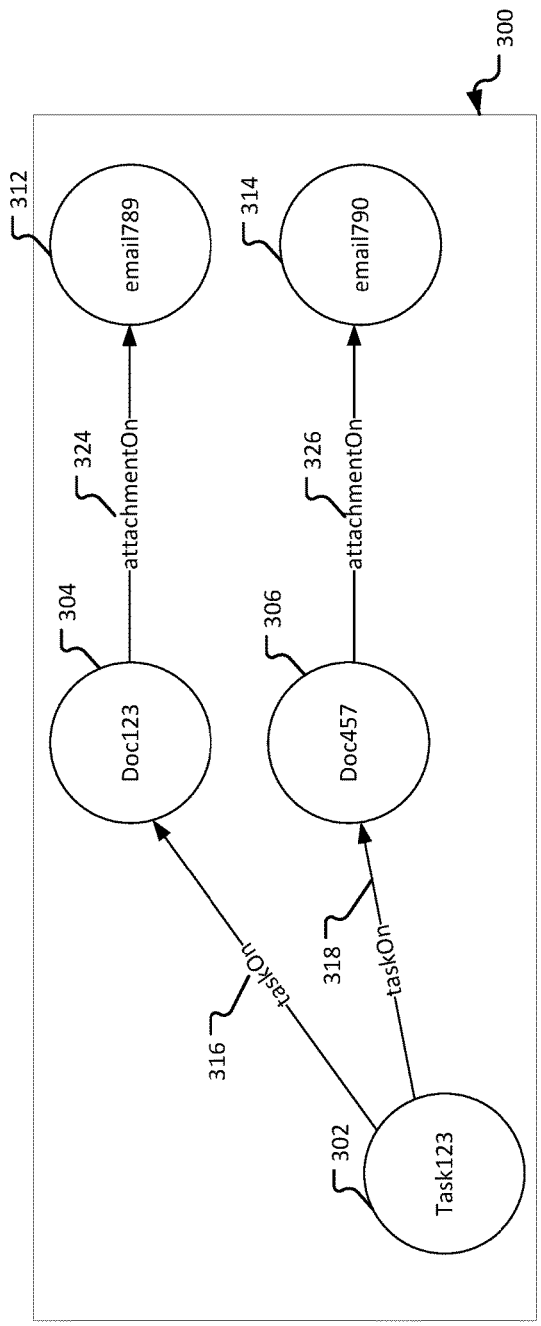
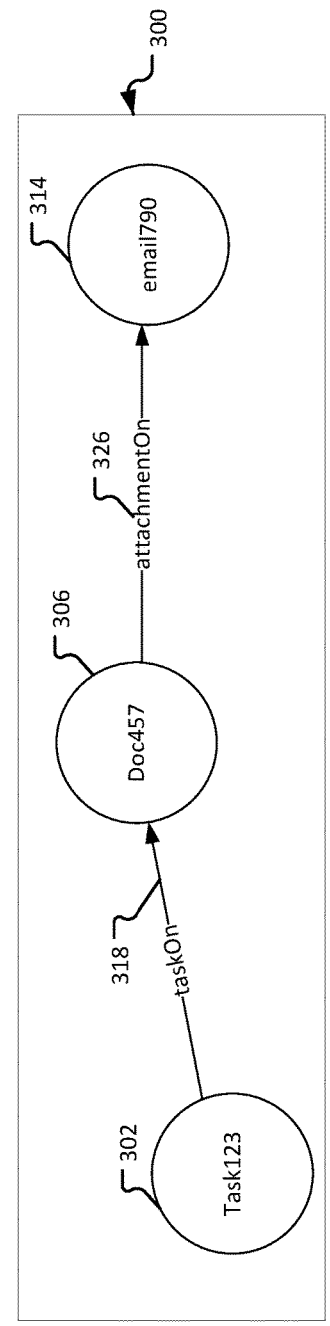

VERSIONING OF INFERRED DATA IN AN ENRICHED ISOLATED COLLECTION OF RESOURCES AND RELATIONSHIPS

BACKGROUND

Storage of data within a database is useful for multiple purposes. For instance, users having access to the database may execute queries against the database to receive results matching their query. Databases and queries have evolved over time, however, databases have generally been mere containers for data that is placed into them by various users. Thus, when a user queries a database, the database is only capable of returning data that has been explicitly provided by the user, or other users, to the database.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

The present technology relates to systems and methods for controlling the versioning of inferred data in an enriched isolated collection of resources and relationships. With the present technology, multiple isolated collections may be generated to represent different resources, such as documents, contacts, tasks, e-mails, or other information, and relationships between those resources. For example, a first resource (e.g., a document) may be an attachment to a second resource (e.g., an e-mail). In such an example, the relationship between the e-mail and the document may be "hasAttachment" or other similar identifying text representing the relationship between the two resources. The relationship between the two resources may be displayed as a graph within an isolated collection where the resources are displayed as nodes of the graph and the relationships are displayed as edges between those nodes. While having individual isolated collections is useful in itself by providing visualization of data to further understand the relationships between different resources, the data within each of the isolated collections may also be enriched to provide further insights into the data and allow for richer queries. A ruleset may be defined or selected for each isolated collection of resources and relationships, thus providing developers with a unique tool to further extract custom insights from a particular isolated collection. Upon executing a ruleset against an isolated collection, additional inferred relationships, among other data, may be determined and incorporated into the isolated collection to enrich the isolated collection. Accordingly, new information is then available to be queried, viewed, or received as input by a user or an application, such as a machine learning application.

Multiple versions of the ruleset may also be created. For instance, a developer may determine that a particular ruleset is insufficient for a particular purpose or that the rules in the ruleset lead to incorrect data being generated within an isolated collection. When multiple versions of rulesets are generated, new version of applications or application programming interfaces (APIs) may be required to properly access and interpret inferred data generated from newer versions of rulesets. However, updates to rulesets do not always correspond to updates to application programming interfaces (APIs) or user applications accessing the isolated collections. With the present technology, for example, when a ruleset is executed against an isolated collection, any inferred relationships that are generated are marked with a version number. As such, the data that has been inferred may be identified and then filtered based on the version number of the ruleset, and queries are able to return results that correspond to the particular API or application version, despite other versions of rulesets having been created. For instance, a query may be sent with a query version indicator that may be used to identify a particular ruleset version, and inferred data generated by the identified ruleset version may be returned in response to the query. In some examples, the identified version of the ruleset may be executed upon receiving the query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 3A-3E illustrate an example isolated collection of asserted resource identifiers and corresponding relationships.

DETAILED DESCRIPTION

Figure 1:
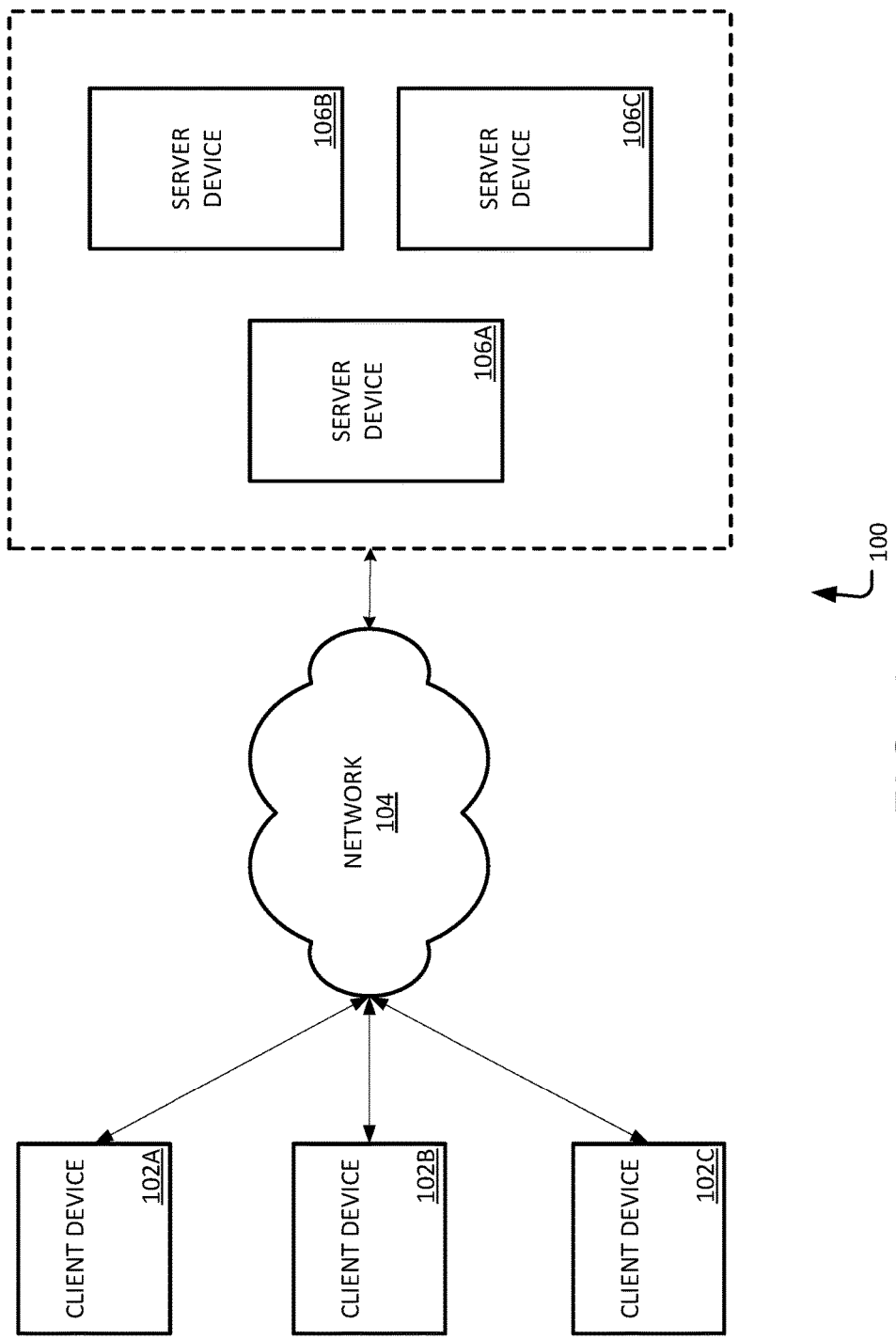
FIG. 1 illustrates an overview of an example system for enriching data in an isolated collection of resources and relationships.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of generating and querying isolated collections of resource identifiers and the relationships between those resources or resource identifiers. A resource may many different forms of data ranging from a file, a website, a document (or a portion thereof), a contact, a task, an e-mail or other communication, a communication channel, data representing a person, a calendar event, or other similar data items. Each resource may be identified by a resource identifier, which may be a durable Uniform Resource Identifier (URI) pointing to the particular resource. The resource identifier may also be a uniform resource locator (URL), uniform resource name (URN), an internationalized resource identifier (IRI), or other suitable identifier or pointers pointing to the resource itself. Relationships identify a correlation between two or more resources in the isolated collection. For instance, a first resource (e.g., a document) may be an attachment to a second resource (e.g., an e-mail). In such an example, the relationship between the e-mail and the document may be "hasAttachment" or other similar identifying text representing the relationship between the two resources.

The resources, or resource indicators, and/or relationships may be provided by a developer or other source. Such resources, resources indicators, and relationships are referred to herein as asserted resources, asserted resource indicators, and asserted relationships. Each isolated collection may also be enriched to create additional relationships and, in some examples, additional resource indicators, by executing a ruleset against the data already in the isolated collection. The additional data generated through execution of such a ruleset is referred to herein as inferred data, such as inferred relationships, inferred resources, and inferred resource identifiers. Queries may then be executed against the isolated collection that includes both the asserted data and inferred data to provide richer results than would otherwise be available solely from the asserted data alone. The isolated collection may also be stored as graph database, and results to queries of the isolated collection may be displayed in a graphical format wherein resources are displayed as nodes and the relationships are displayed as edges. As used herein, an isolated collection of resource identifiers and the relationships between those resources or resource identifiers may be referred as a "Set." Further, access to the isolated collection may be controlled through various techniques to provide additional security measures for the content in each isolated collection, and each isolated collection may have different rulesets to generate unique and different inferred data to meet the particular needs of each application.

The present technology also provides for updating rulesets to create multiple versions of rulesets. For instance, a developer may determine that a particular ruleset is insufficient for a particular purpose or that the rules in the ruleset lead to incorrect data being generated within an isolated collection. When multiple versions of rulesets are generated, the later versions may not be backwards compatible with the earlier versions and earlier versions may not be compatible with the later versions. However, updates to rulesets do not always correspond to updates to application programming interfaces (APIs) or user applications accessing the isolated collections. For example, a developer may update a ruleset to a new version and also provide an update to an API or external application, but the user may not download or accept the new update to the API. Accordingly, users that are operating a prior version of an API or application would submit queries based on a ruleset of a corresponding to previous version of the ruleset. Where the rulesets are not backwards compatible, execution of the query may result in an error or query results that are incomplete or misleading. Thus, there is a need for handling multiple versions of rulesets such that queries received from different versions of APIs and applications are executed against data generated by the correct corresponding ruleset.

The present technology provides multiple solutions to controlling multiple versions of rulesets. In an example, when a ruleset is executed against an isolated collection, a version identifier is incorporated into any inferred relationships that are generated. As such, the data that is inferred may be identified and then filtered based on the version number of the ruleset, and queries are able to return results that correspond to the particular API or application version, despite other versions of rulesets having been created. By marking each of the inferred relationship with a version indicator, such as a version number, additional technical benefits are also realized. As an example, there is no need to store multiple versions of the isolated collection itself. For instance, without versioning the inferred edges and nodes themselves, multiple isolated collections would be need to be stored, e.g., one for each version of the ruleset. Storing multiple versions of a database, however, results in potential problems resulting from having to synchronize the asserted data across each of those isolated collections. If an asserted reference were to be added or updated in one version of the isolated collection, that update or addition would need to be synchronized across all versions of isolated collections. By versioning the inferred data with the present technology, such technical problems are avoided.

FIG. 1 illustrates an overview of an example system for enriching data in an isolated collection of resources and relationships as described herein. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 9-11. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rulesets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
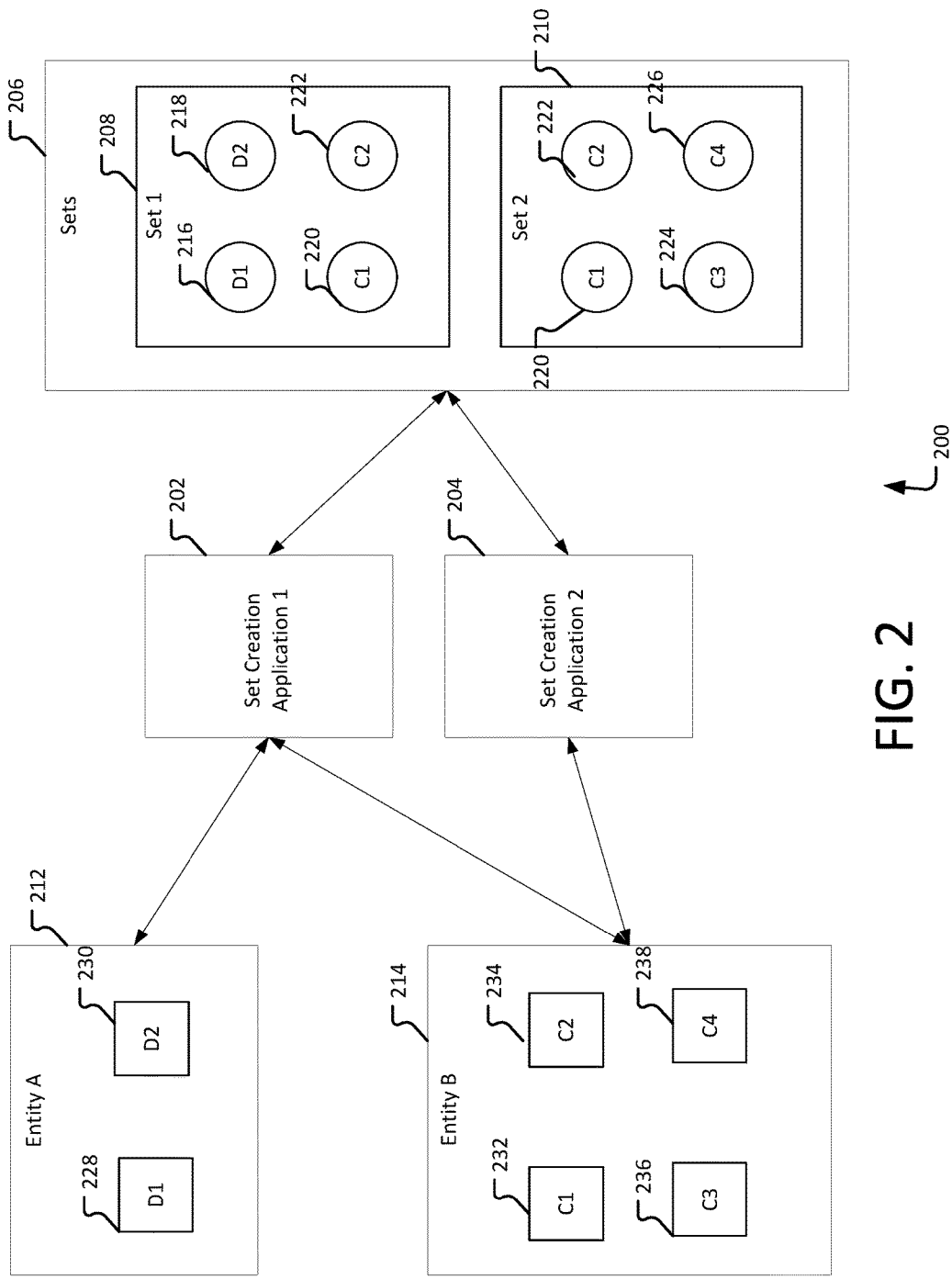
FIG. 2 illustrates an overview of an example system for managing isolated collection of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be collocated with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures, such as nodes and edges, that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
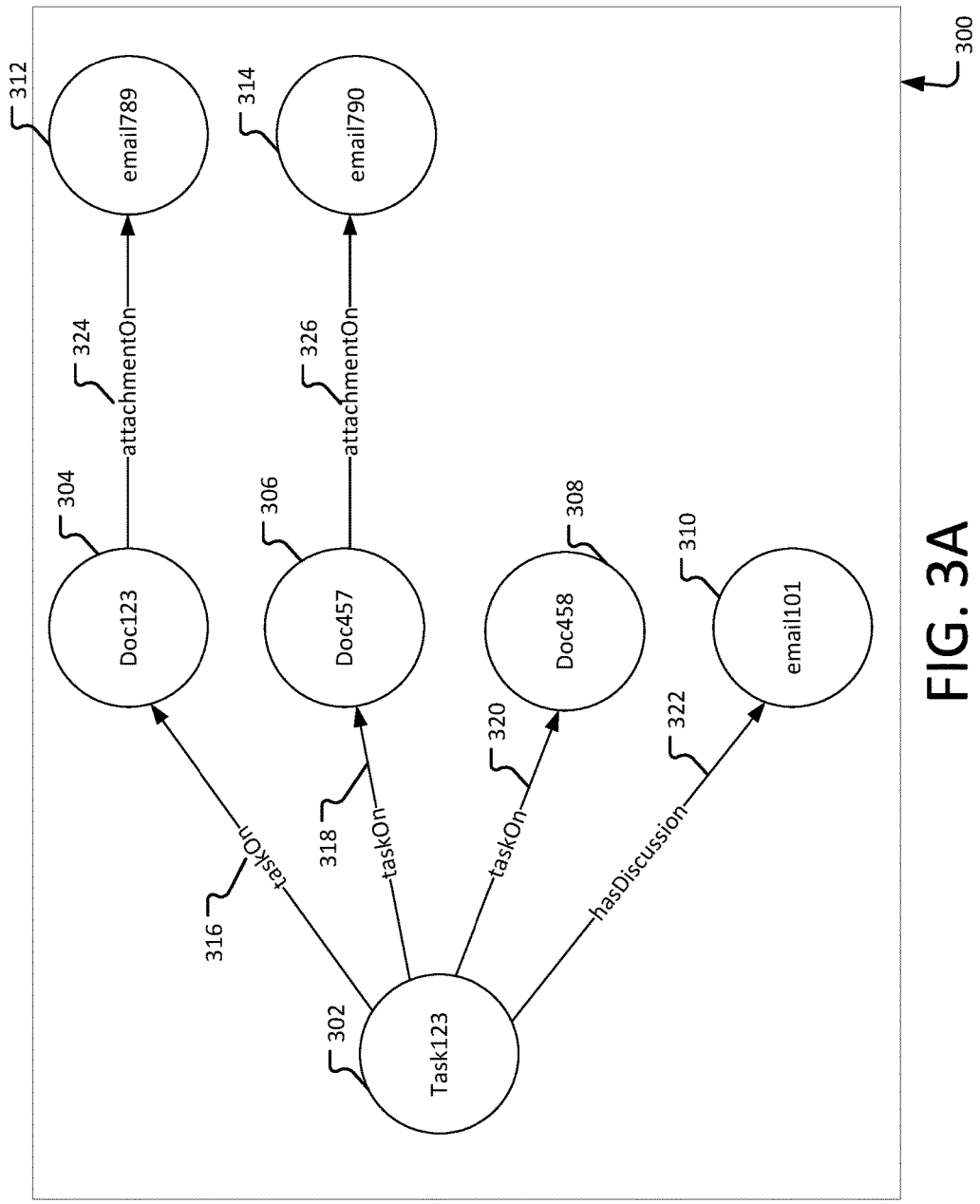

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers.

As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationship, a collection creation utility may execute a ruleset to determine additional relationships and resource types, referred to herein as "inferred relationships" and "inferred resource identifiers" or "inferred resource types." Generation of inferred relationships and resources is discussed in further detail below.

Isolated collection 300 further depicts that resource identifier 302 is associated with resources identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail101. While specific types of resources and relationships are described in FIG. 3A, one of skill in the art will appreciate that other types of resources and/or relationships may be included in an isolated collection without departing from the spirit of this disclosure.

Figure 3C:
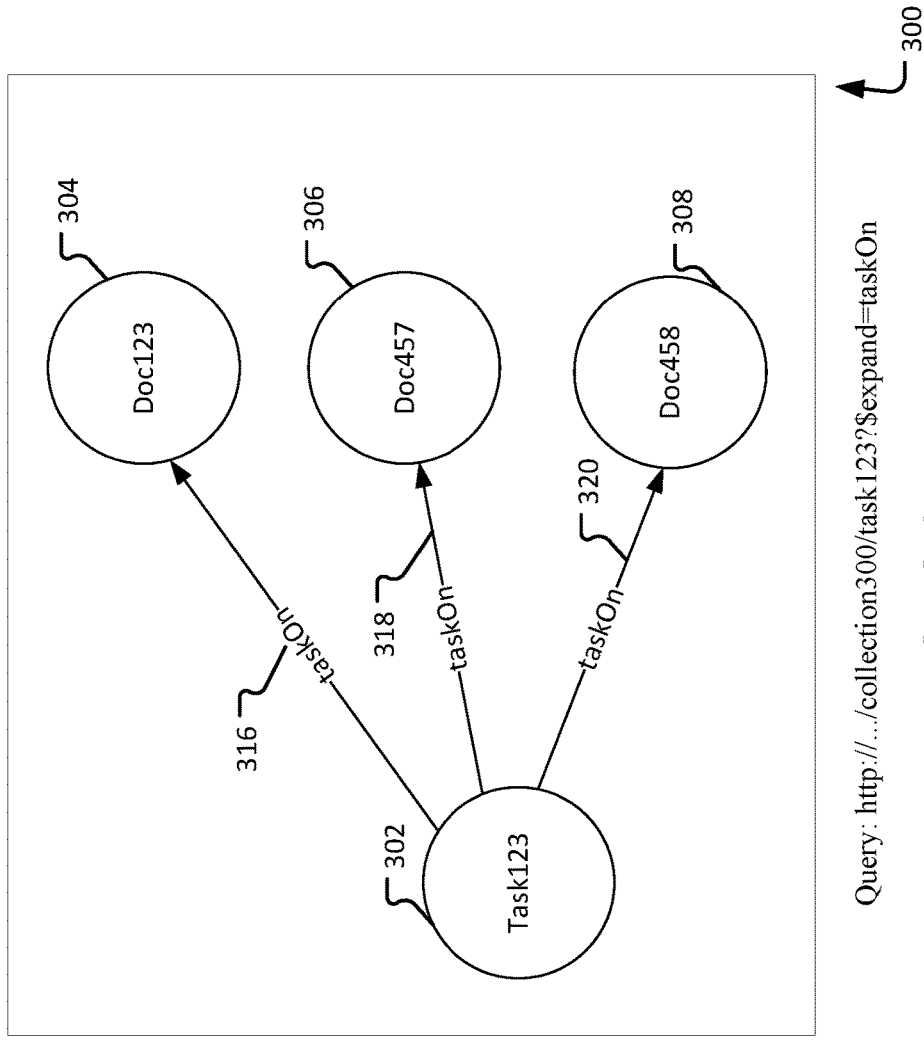
Figure 3B:
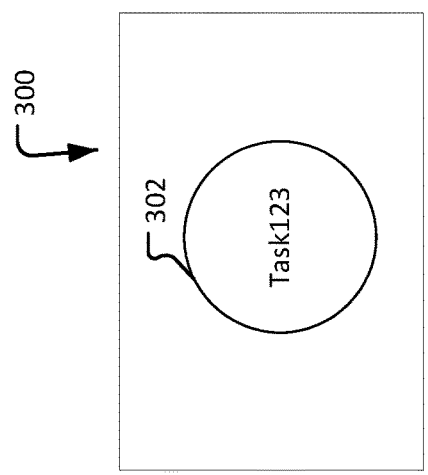

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http://.../collection300/task123' may be executed against collection 300. The query results may comprise resource identifier 302 and be visualized as illustrated in FIG. 3B. In FIG. 3C, the query has been amended to 'http://.../collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http://.../collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to 'http://.../collection300/task123?($expand=taskOn ($expand=attachmentOn($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4A:
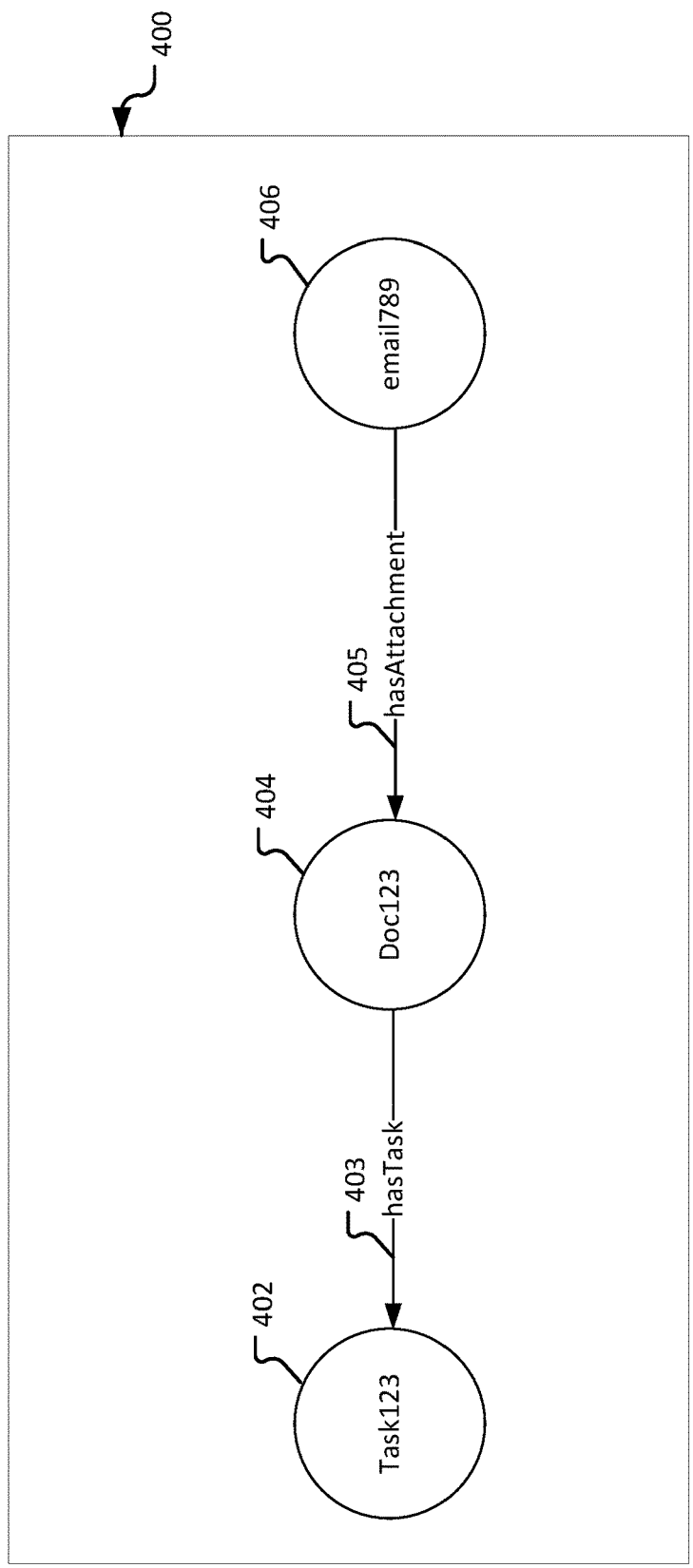
FIG. 4A depicts a sample isolated collection having a plurality of asserted resource identifiers and asserted relationships.

FIG. 4A depicts a sample isolated collection 400A having a plurality of asserted resource identifiers and asserted relationships. More specifically, the isolated collection 400 includes three resource identifiers—resource identifier 402 representing a task resource "Task123," resource identifier 404 representing a document resource "Doc123," and resource identifier 406 representing an e-mail resource "e-mail789." A relationship 403 of "hasTask" exists between resource identifier 404 and resource identifier 402. In utilizing terminology from the Web Ontology Language (OWL), the domain of the relationship 403 is resource identifier 404 and the range of relationship 403 is resource identifier 402. Thus, the relationship 403 is directional in that it indicates that "Doc123" has a task of "Task123," rather than the other way around. A relationship 405 of "hasAttachment" also exists between resource identifier 406, and relationship has a range of resource identifier 404 and a domain of resource identifier 406. Like relationship 403, relationship 405 is also directional, e.g., relationship 405 states that "email789" has an attachment of "Doc123," rather than the other way around. While the data depicted in in isolated collection 400 in FIG. 4A is useful on its own, it would be more beneficial to be able to enrich the data to provide further insights and allow for richer queries to be performed on the data. For instance, in utilizing the expand query types discussed above with reference to FIGS. 3A-3C, expansions of the graph visualizations could only occur in one direction. For instance, there would be no expansions possible if the expansion process started with resource identifier 402, due to the directional relationship 403. By executing a ruleset against the isolated collection 400A, however, additional data may be generated and directionality problems may be resolved.

Figure 4B:
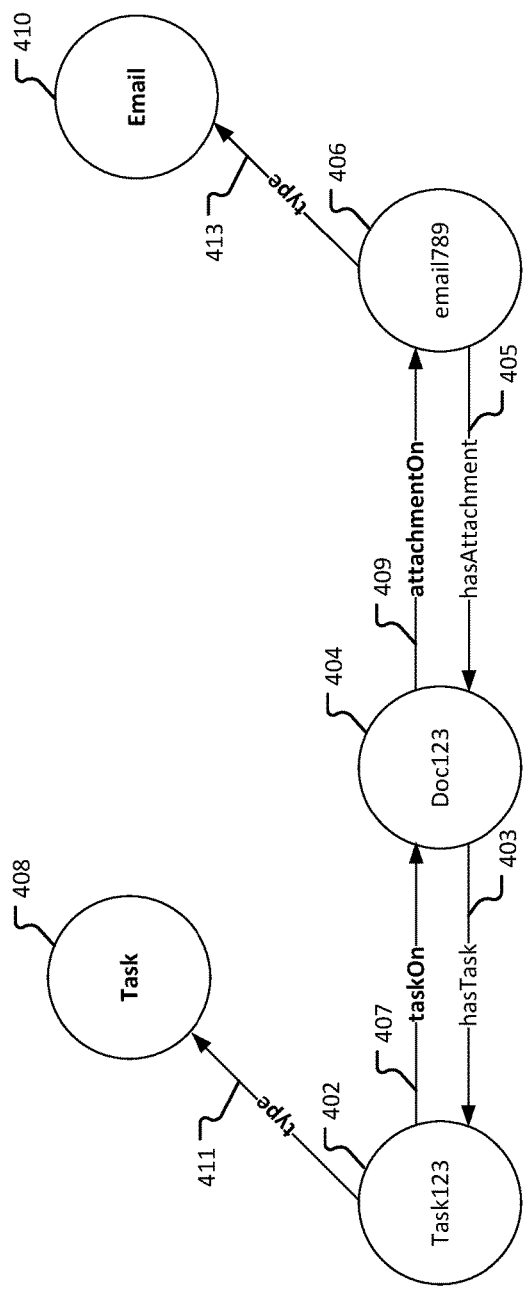
FIG. 4B depicts an enriched isolated collection after executing a ruleset against an isolated collection
Figure 4B:
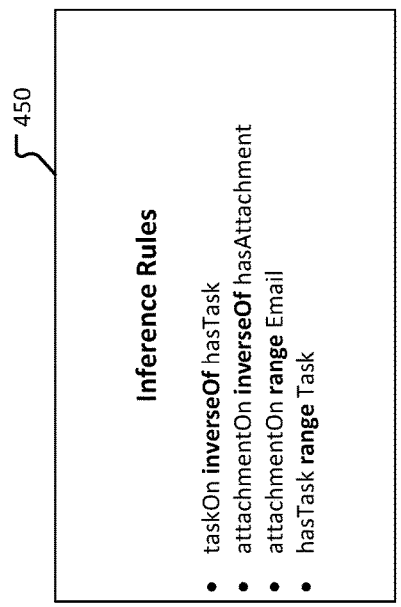

FIG. 4B depicts an enriched isolated collection 400B after executing a ruleset 450 against the isolated collection 400A. As discussed above, the ruleset 450 may be provided by a develop through a developer user interface. Accordingly, different rulesets may be provided for different isolated collections. Further, the rulesets are also fully customizable for each of the isolated collections such that the developer may generate any types of rules that suitable for the particular application.

The ruleset 450 includes the following rules: (1) "taskOn" inverseOf "hasTask;" (2) "attachmentOn" inverseOf "hasAttachment;" (3) "attachmentOn" range "Email;" and (4) "hasTask" range "Task." Rule (1) "taskOn" inverseOf "hasTask" establishes that a relationship "taskOn" is the inverse of the relationship "hasTask." Each of the rules in the ruleset are based on the value of at least one of the relationships in the isolated collection. Upon executing Rule (1) against the isolated collection 400A, an additional relationship 407 of "taskOn" is generated, having the inverse direction of the "hasTask" relationship 407. For instance, the task on relationship 407 has a range of "Doc123" and a domain of "Task123" to indicate that "Task123" is a task on "Doc123." Rule (2) is similar to Rule (1) in that it generates an inverse of a relationship. In particular, Rule 2 generates an "attachmentOn" relationship 409 based on the "has Attachment" relationship 405. The "attachmentOn" relationship 409 has a direction opposite that of the "hasAttachment" relationship 405.

Rules (3) and (4) determine a type or class of resource indicator based on a relationship that either has a domain or range of the particular resource indicator. For example, Rule (3) "attachmentOn" range "Email" establishes that the range of an "attachmentOn" is of a type "Email." In the example depicted, execution of Rule (3) causes a "type" relationship 413 to be created as well as type node 410 that indicates the type "Email." Rule (4) is similar to Rule (3) in that it establishes a type of a resource identifier based on a relationship that has a range of that resource identifier. In particular, Rule (4) establishes that the range of a relationship "taskOn" is of the type "Task." In the example depicted, execution of Rule (4) causes a "type" relationship 411 to be created as well as type node 408 that indicates the type "Task." In other examples, a new node need not be created to establish the type of the resource indicator when executing rules similar to Rules (3) and (4). Rather, a class may be established for the particular type and then associated with the respective resource indicator or a type may be established within the data representing the resource indicator itself.

By executing such a ruleset 450 against the isolated collection, additional inferred data is created within the isolated collection 400A to generate the enriched isolated collection 400B. With the additional inferred data in the enriched isolated collection 400B, richer queries may be run against the enriched isolated collection 400B. For instance, expand queries may be executed from any resource indicator in the enriched isolated collection 400B. Further, queries regarding the type of resource indicators in the isolated collection may also be performed.

The present technology also provides for updating rulesets to create multiple versions of rulesets. For instance, a developer may determine that a particular ruleset is insufficient for a particular purpose or that the rules in the ruleset lead to incorrect data being generated within an isolated collection. When multiple versions of rulesets are generated, the later versions may not be backwards compatible with the earlier versions and earlier versions may not be compatible with the later versions. However, updates to rulesets do not always correspond to updates to application programming interfaces (APIs) or user applications accessing the isolated collections. For example, a developer may update a ruleset to a new version and also provide an update to an API or external application, but the user may not download or accept the new update to the API. Accordingly, users that are operating a prior version of an API or application would submit queries based on a ruleset of a corresponding to previous version of the ruleset. Where the rulesets are not backwards compatible, execution of the query may result in an error or query results that are incomplete or misleading. Thus, there is a need for handling multiple versions of rulesets such that queries received from different versions of APIs and applications are executed against data generated by the correct corresponding ruleset.

Figure 4C:
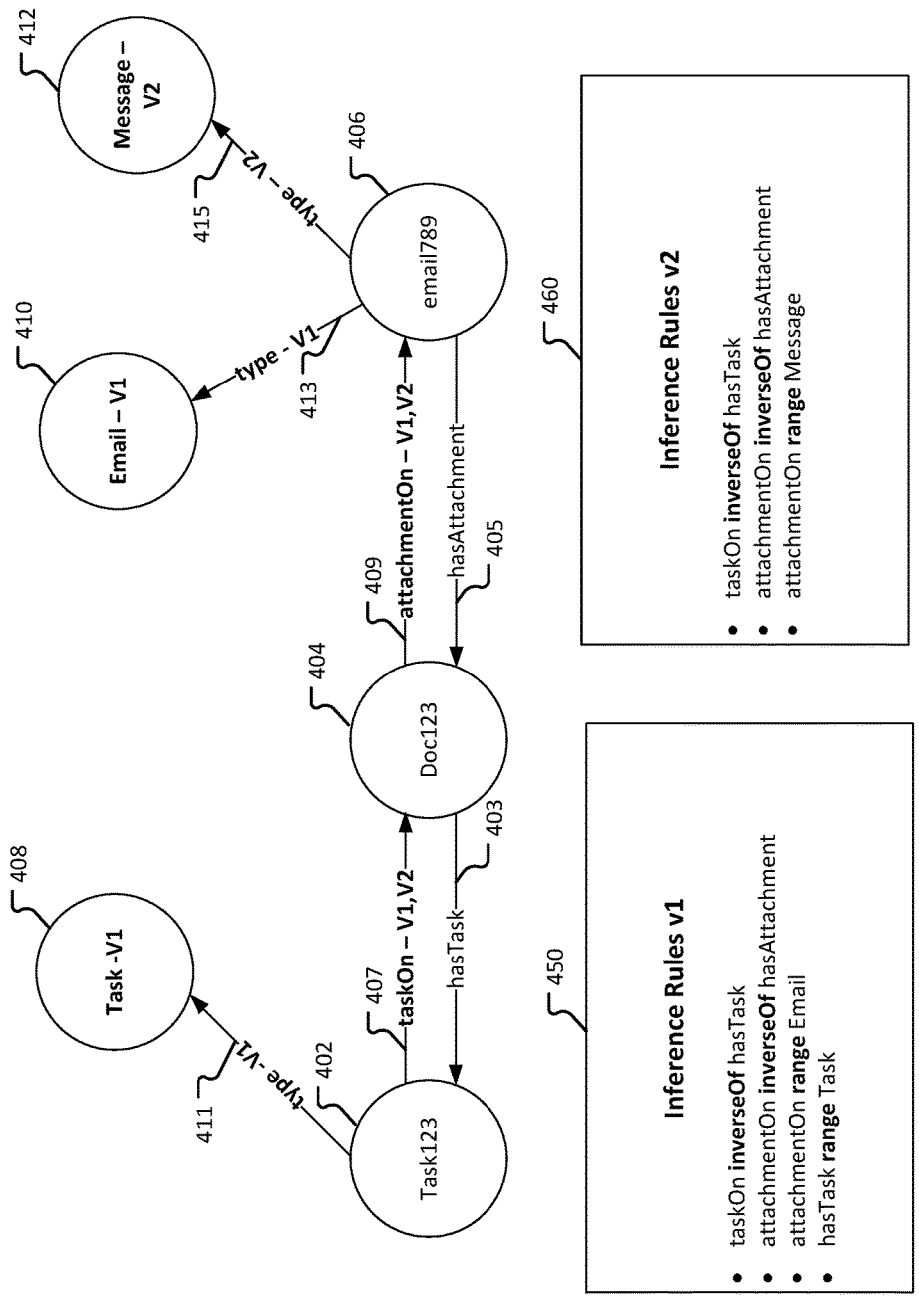
FIG. 4C depicts an example of an enriched isolated collection after executing multiple versions of rulesets against an isolated collection.

The present technology provides multiple solutions to such problems, among others. In an example, when a ruleset is executed against an isolated collection, any inferred relationships that are generated are marked with a version number or other version identifier, such as a version name. As such, the data that has been inferred may be identified and then filtered based on the version number of the ruleset, and queries are able to return results that correspond to the particular API or application version, despite other versions of rulesets having been created. FIG. 4C depicts an example of an enriched isolated collection 400C. The enriched isolated collection 400C resulted from executing Ruleset Version 1 450 and Ruleset Version 2 460 against the asserted resources and relationships in isolated collection 400A depicted in FIG. 4A. Ruleset Version 2 may be a ruleset that has been updated by a developer. Ruleset Version 2 includes the following rules: (1) "taskOn" inverseOf "hasTask;" (2) "attachmentOn" inverseOf "hasAttachment;" and (3) "attachmentOn" range "Message." The first two rules of Ruleset Version 1 450 and Ruleset Version 2 are the same, but the third rule differs and the fourth rule in Ruleset Version 1 450 is not present in Ruleset Version 2. Accordingly, some of the inferred relationships and inferred nodes differ depending on the ruleset that is executed. Thus, for each inferred relationship or node generated by a particular ruleset, a version identifier is generated for each respective inferred relationship or node to indicate which version of the ruleset caused the creation of the respective inferred relationship or node. Where two or more versions of the ruleset cause the creation of the same inferred relationship or node, that relationship or node may be stamped with multiple version identifiers. The version identifier may be the version number or version name of the particular ruleset or in other examples may be a timestamp indicating when the ruleset was executed against the isolated collection 400A, as discussed further below.

As an example, execution of Ruleset Version 1 results in the creation of inferred relationship 411, type node 408, inferred relationship 413, the type node 410, inferred relationship 407, and inferred relationship 407, as discussed above with reference to FIG. 4B. Each of the those inferred relationships are marked with a version identifier as shown in FIG. 4C, which in the example depicted is the version number of the ruleset. Execution of Ruleset Version 2 also results in the creation of inferred relationship 407 and inferred relationship 409. As such, inferred relationship 407 and inferred relationship 409 is also marked with a version identifier for Ruleset Version 2. Execution of Ruleset Version 2 also creates inferred relationship 415 and type node 412 to establish that the email789 resource indicator 406 is of a message type. Inferred relationship 415 and type node 412 are marked with a version identifier for Ruleset Version 2.

By marking each of the generated inferred queries with the respective version identifiers, results to queries may be filtered based on the appropriate ruleset. For instance, upon receiving a query, a query identifier may be extracted from the query. From the query identifier, the appropriate ruleset version may be ascertained, as discussed in further detail below. By marking each of the inferred relationship with a version number, additional technical benefits are also realized. As an example, there is no need to store multiple versions of the isolated collection itself. For instance, without versioning the inferred edges and nodes themselves, multiple isolated collections would be need to be stored, e.g., one for each version of the ruleset. Storing multiple versions of a database, however, results in significant issues with having to synchronize the asserted data across each of those isolated collections. If an asserted reference were to be added or updated in one version of the isolated collection, that update or addition would need to be synchronized across all versions of isolated collections. By versioning the inferred edges with the present technology, such technical problems are avoided.

Further, when any portion of an enriched isolated collection, such as enriched isolated collection 400B and enriched isolated collection 400B, is displayed to a user, the inferred relationships and nodes may be displayed in a different manner than the asserted resource identifiers and relationships. For instance, the inferred relationships and nodes may be shown in bold and the asserted resources and relationships may be shown un-bolded, as shown in FIGS. 4B and 4C. Other differentiating characteristics may include font color, highlighting, underlining, italicizing, shape of edges and/or connectors, and other similar differentiating characteristics. Thus, a user viewing the isolated set, or a portion thereof a result to a query, is able to distinguish between the asserted and inferred data.

Figure 5:
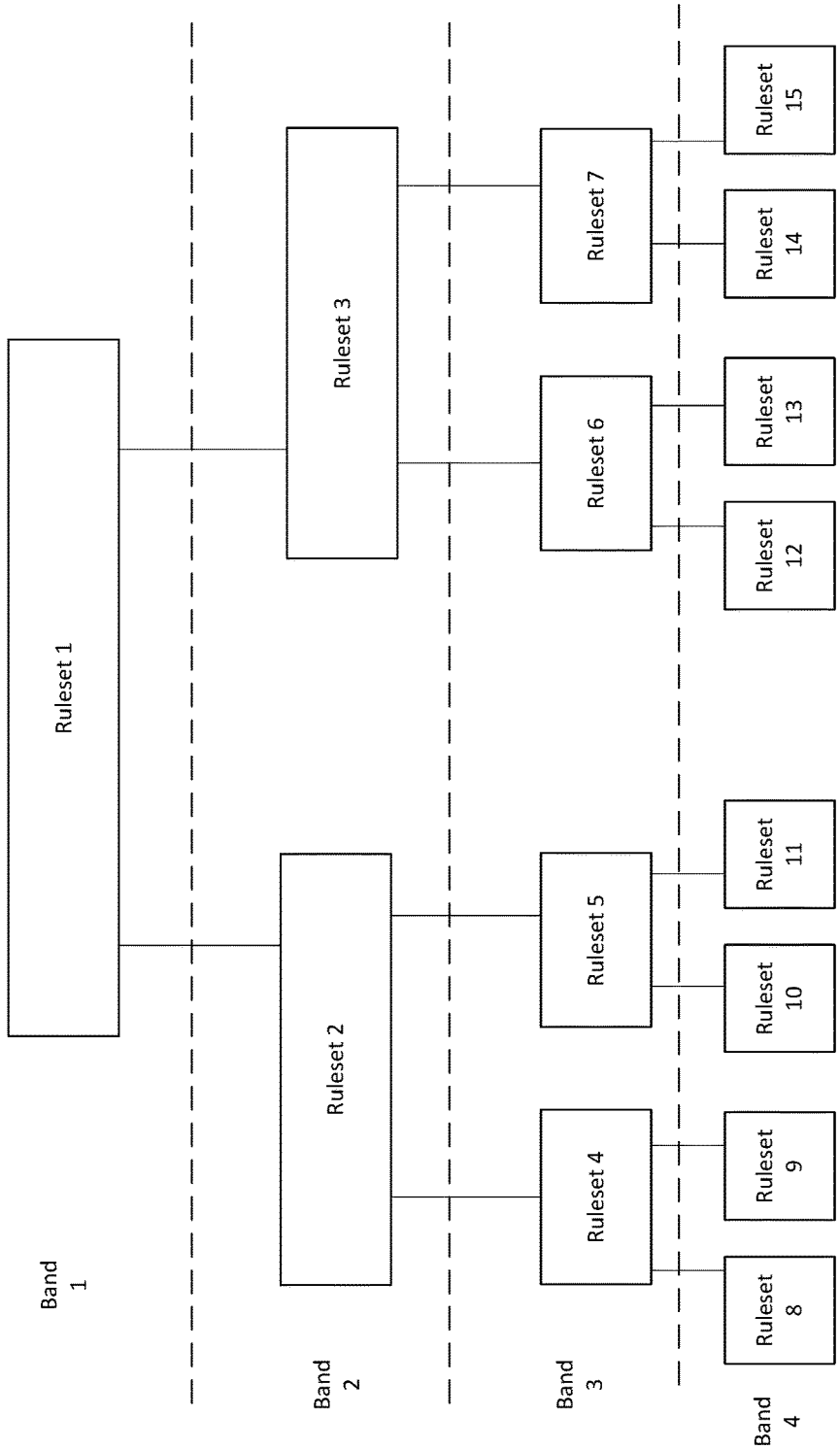
FIG. 5 depicts a hierarchy of rulesets for execution against an isolated collection.

FIG. 5 depicts a hierarchy of rulesets for execution against an isolated collection. As discussed above, different rulesets may be generated by developers for different isolated collections. In some examples, those rulesets may be manually generated by the developer. In other examples, rules or full rulesets may be selected from premade rulesets, and such premade rulesets may be arranged in a hierarchy with different bands, or levels, as depicted in FIG. 5. For example, rulesets in Band 1, such as Ruleset 1, may apply globally to wide array of isolated collections and resources and relationships within many different types of isolated collections. Rulesets in Band 2, such as Ruleset 2 and Ruleset 3, may be more specifically tailored than the rulesets in Band 1. For example, Ruleset 2 may apply to resources and relationships based on MICROSOFT products or services, whereas Ruleset 3 may apply to resources and relationships for another company's products or services. Rulesets in Band 3, such as Rulesets 4-7, may be more specifically tailored than the rulesets in Band 2. For example, the rulesets in Band 3 may apply specifically to product groups. For instance, Ruleset 4 may apply to resources based on MICROSOFT OFFICE products. Rulesets in Band 4, such as Rulesets 8-15, may be yet more specific than the rulesets in Band 3. For example, Ruleset 8 may include rules specific to resources and relationships based on the MICROSOFT WORD product and Ruleset 9 may include rules specific to resources and relationships based on the MICROSOFT EXCEL product. Even more narrowly tailored bands (not depicted) of the hierarchy may be available for selection. For example, a developer may generate a ruleset that is applicable to specific group of isolated collections. Further, any rulesets that are generated by a developer may be placed in a data store to be reused by the developer or shared with other developers. One or more rulesets may be selected by a developer to apply to one or more isolated collections, and the selected rulesets may be combined or edited before or after their execution against the one or more isolated collections.

Additional types of rulesets may also be selected or created for analytics or machine learning programs that may be different from general rules that generate inferred relationships. For example, a set of rules for use in a neural network, such as a deep neural network or recurrent neural network, may different from those rules utilized for other applications because those rules are meant for analytics and statistics for the neural network. Such rules may generate inferred relationships in special ways that are more useful for a neural network.

Whether the rulesets are selected from premade rulesets, such as from the hierarchy above, or rules are provided individually by the developer, a developer is able to preview the application of the rules within the ruleset prior to fully implementing the ruleset. For example, the developer may be able to input or select and individual rule, or group of rules, and have those rule(s) executed against an isolated collection. The resulting inferred data may then be displayed similar to the inferred data displayed in FIGS. 4B-4C. If the developer does not desire the displayed results, the inferred data may be discarded and the corresponding rule may also be discarded or edited to achieve the results desired by the developer. In further examples, multiple versions of rulesets may be previewed concurrently to determine difference outcomes of executing different versions of rulesets. For instance, a new version of a ruleset may be previewed against an isolated collection having inferred relationships resulting from execution of a previous version of the ruleset. Such a combined display Such a comparison provides assistance in generating and debugging rules. In further examples, a delta query may be executed against the multiple versions of rulesets to return the differences between the outcomes of the first version of the ruleset and the second version of the ruleset. Such results may be generated by providing each inferred relationship that contains a version identifier for a first version of the ruleset or a version identifier for the second version, but not both version identifiers. Other possible methods for executing a delta query are possible.

Figure 6:
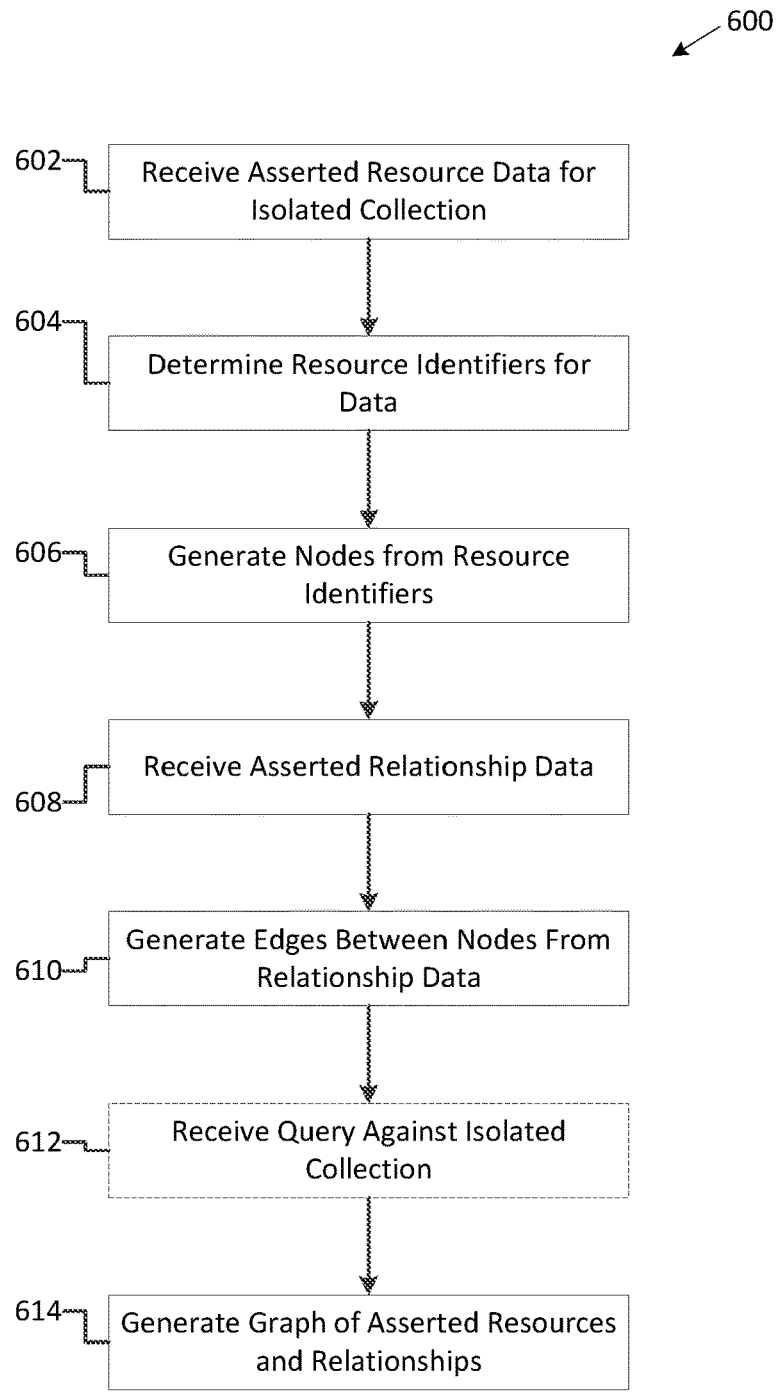
FIG. 6 depicts a method for generating an isolated collection.

FIG. 6 depicts a method 600 for generating an isolated collection. Method 600 begins at operation 602 where asserted resource data is received. The resource data indicates the resources that are to be represented within the isolated collection. A resource may many different forms of data ranging from a file, a document (or a portion thereof), a contact, a task, an e-mail or other communication, a communication channel, data representing a person, a calendar event, or other similar data items. The resources themselves need not be stored within the isolated collection. Rather, resource identifiers are stored within the isolated collection. Accordingly, at operation 604, a resource identifier is extracted for each of the resources to be represented within the isolated collection. The resource identifier for a particular resource may be a durable Uniform Resource Identifier (URI) pointing to the particular resource. The resource identifier may also be a uniform resource locator (URL), uniform resource name (URN), or other suitable identifier or pointers pointing to the resource itself. The resource resources and/or resource identifiers may be asserted by developer directly, or they may be asserted by an external bot or application created by a developer. For instance, an add-in may be programmed to monitor activity in a browser or other application to track usage of the application. Based on the usage of the application, the add-in sends asserted resources to be included in the isolated collection. At operation 606, graphical nodes are generated for each of the resource identifiers to be included in a graphical representation of the isolated collection.

At operation 606, asserted relationship data is received. The relationship data indicates a relationship between two or more resources. Similar to the asserted resources, the relationship data may be asserted by developer directly, or they may be asserted by an external bot or application created by a developer. For instance, an add-in may be programmed to monitor activity in a browser or other application to track usage of the application. Based on the usage of the application, the add-in asserts relationships between the asserted resources to be included in the isolated collection. For directional relationships, the asserted relationship data may also establish the range and domain for the asserted relationship. At operation 610, graphical edges are generated for each of the asserted relationships received in the relationship data to be included in a graphical representation of the isolated collection. In alternate examples, the graphical edges may be generated upon receiving a command. For example, the graphical edges may be generated upon receiving a query for the isolated collection.

At optional operation 612, a query may be received against the isolated collection. The query may in the form of the queries discussed above with reference to FIGS. 3A-3E. At operation 614, a graph is generated including the nodes representing the asserted resources and edges between the nodes representing the asserted relationships. In examples where a query is received at operation 612, the graph may be generated in response to the query. In such an example, the graph includes the results to the query.

Figure 7A:
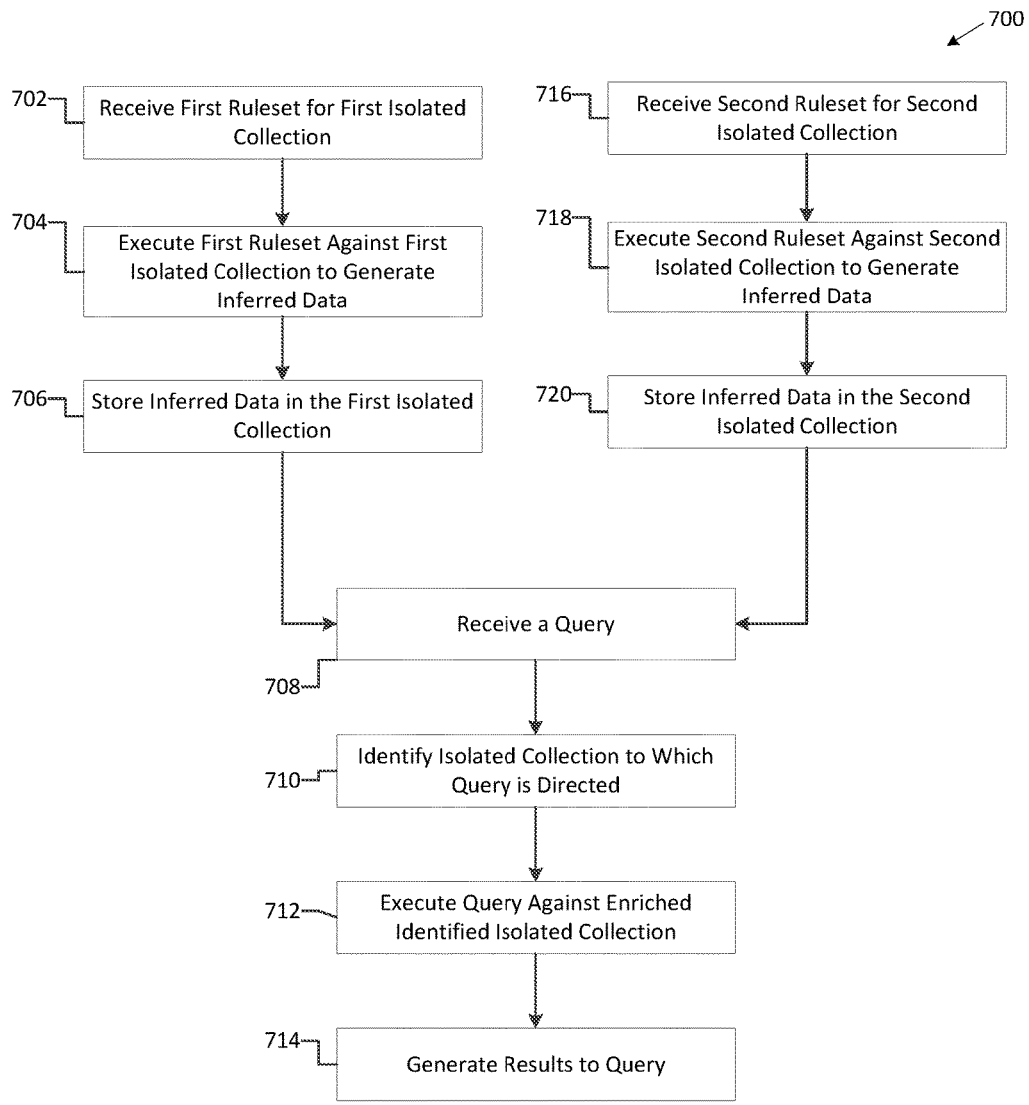
FIG. 7A depicts a method for enriching data in isolated collections of resources and relationships prior to receiving a query.

FIG. 7A depicts a method 700 for enriching data in isolated collections of resources and relationships prior to receiving a query. At operation 702, a first ruleset is received or accessed for a first isolated collection, such as the isolated collection generated by method 600. At operation 704, the first ruleset is executed against the first isolated collection to generate inferred data. The inferred data may include inferred relationships and/or inferred type nodes. The first ruleset may be provided by a developer or selected from a list, such as one of the rulesets within the hierarchy depicted in FIG. 5. In some examples, operation 704 may be triggered upon receiving the ruleset or a selection of the ruleset. Operation 704 may also be triggered upon the addition or alteration of any asserted data within the isolated collection. Once the inferred data has been generated in operation 704, that inferred data is stored within the isolated collection at operation 706 to create an enriched first isolated collection. The inferred relationships may also be maintained separately from the asserted data in the isolated collection. For example, the inferred data may be marked so as to indicate its inferred status, or it may be stored in a separate portion of memory. By separately maintaining the inferred data from the asserted data, deletion of asserted data upon execution of the ruleset may be prevented. For instance, a ruleset may include rules that would change or delete a particular resource identifier or relationship. Such changes, in some examples, may be prevented when the resource identifier or relationship is asserted.

Further, in some examples, execution of the ruleset may take a substantial amount of time and queries may not be able to be executed against the isolated collection during that time. As such, once the execution of the ruleset is complete and the inferred data is stored, operation 706 may further include sending a notification that execution of the ruleset is complete, thus indicating queries are being accepted against the enriched isolated collection.

Inferred data may also be similarly generated for a second isolated collection, and operations 716-720 and substantially the same as operations 702-706 but for a second isolated collection and a second ruleset. For instance, at operation 716 a second ruleset for a second isolated collection is accessed or received. The second ruleset may be different from the first ruleset. That second ruleset is executed against the second isolated collection to generate inferred data at operation 718. The inferred data generated at operation 718 is stored in the second isolated collection at operation 720 to create an enriched second isolated collection.

At operation 708 a query is received from a user or user application. At operation 710, the isolated collection to which the query is directed is identified. For example, in the queries depicted in FIGS. 3-3E, the isolated collection to which the query is directed is "collection300." Upon identifying the isolated collection, the query is executed against the identified isolated collection at operation 712, and results to the query are generated in operation 714. The results to the query include at least some of the asserted resources and some of the inferred data resulting from execution of the ruleset against the isolated collection. The results may be displayed graphically as depicted in at least FIGS. 3A-3E. In some examples, an access credential must also be provided prior to the results being presented. The access credential may be provided with the query or in other manners to prevent unauthorized users from accessing the isolated collection.

Figure 7B:
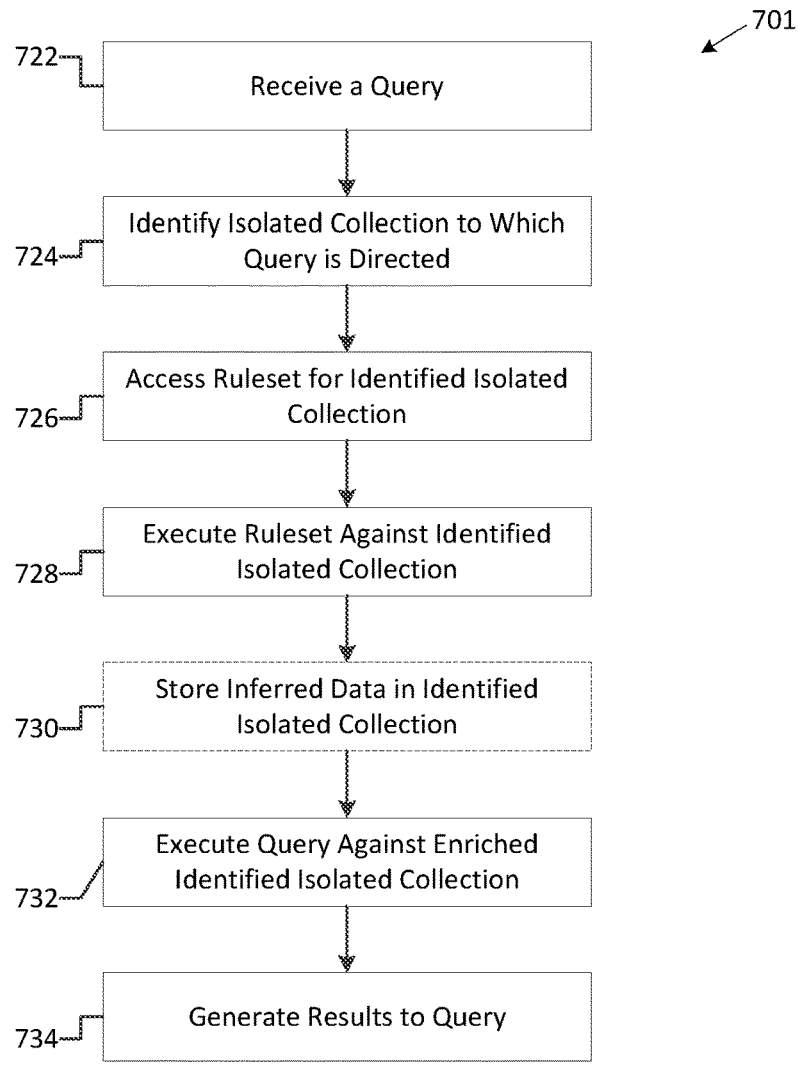
FIG. 7B depicts a method for enriching data in isolated collections of resources and relationships upon receiving a query.

FIG. 7B depicts a method 701 for enriching data in isolated collections of resources and relationships upon receiving a query. Method 701 is substantially similar to method 700 except that in method 701, a ruleset is executed against an isolated collection upon receiving a query rather than upon receiving changes to the isolated collection itself. At operation 722, a query is received for data in an isolated collection. At operation 724, the isolated collection to which the query is directed is identified. At operation 726, a ruleset for the identified isolated collection is accessed or received, and at operation 728, the accessed ruleset is executed against the identified isolated collection to generated inferred data to be incorporated into the isolated collection to create an enriched isolated collection. In some examples, the inferred data is permanently stored in the isolated collection at operation 730. In other examples, the inferred data may be temporarily stored or cached for an amount of time sufficient for the query to be executed against the inferred data in the enriched isolated collection. At operation 732, the query is executed against the enriched isolated collection to generate results to the query in operation 734. The results of the query include at least some of the asserted data and some of the inferred data, and may be displayed in a graph form.

Further, in some examples, a portion of the rules in the ruleset may be executed upon a change to the isolated collection (as in method 700 in FIG. 7A) and another portion of the rules in the ruleset may be executed upon receiving a query (as in method 701 in FIG. 7B). For instance, the ruleset may be parsed to identify a first portion or subset of rules that may be executed quickly and a second portion or subset of rules that require more processing time. As an example, some rules may have a known complexity factor and may be categorized based on that complexity factor. In another example, a processing time for a particular rule may be compared to a threshold processing time. The complexity factor and the size of the isolated collection may also be indicative of processing time and used in such a comparison. The subset of rules that require additional processing time are then executed at update time, e.g., upon a change or update to the isolated collection, whereas the subset of rules that requires less processing time are processed at query time, e.g., upon receiving a query.

Figure 7C:
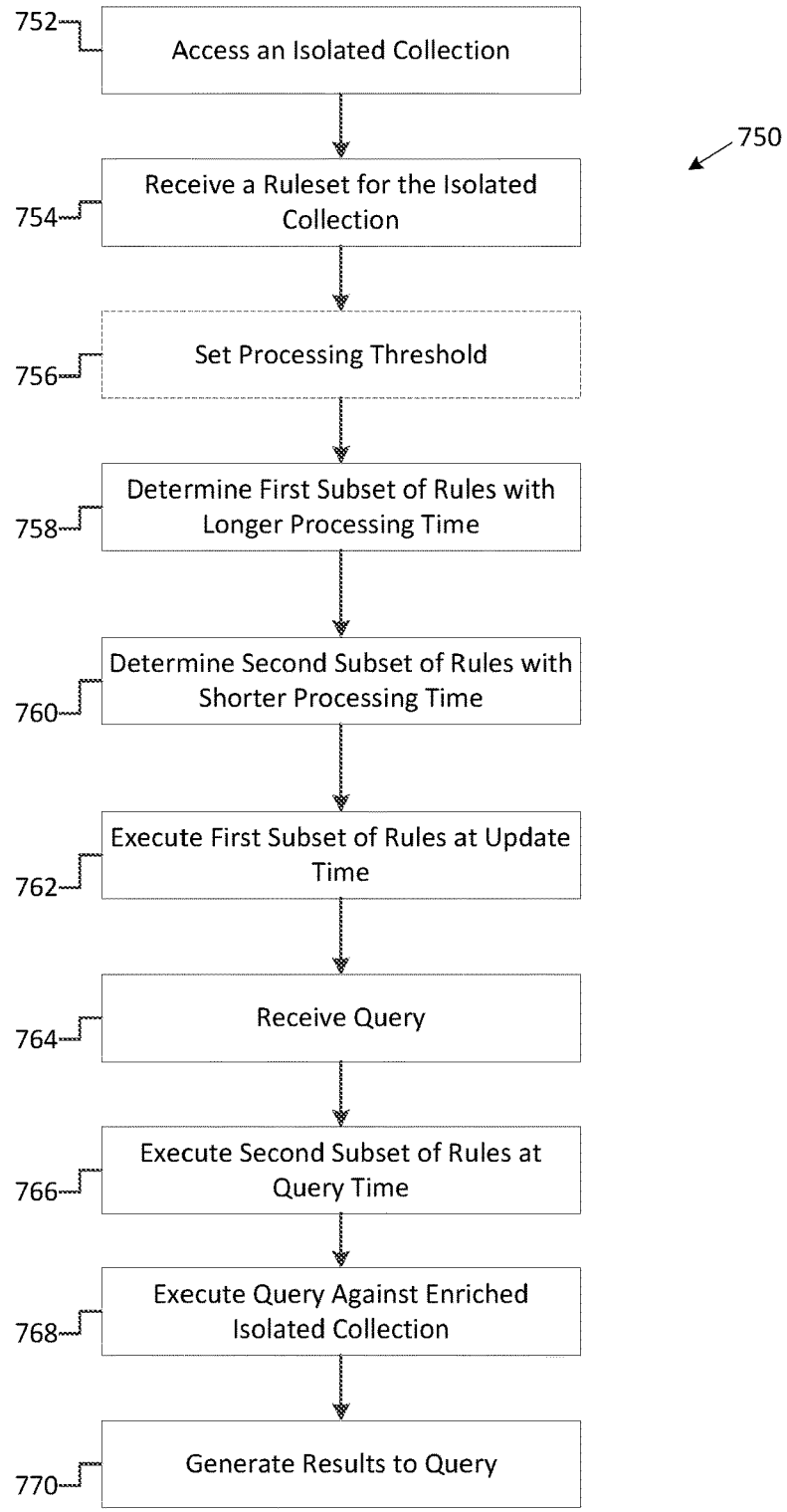
FIG. 7C depicts a method for enriching an isolated collection at update time and at query time.

FIG. 7C depicts a method 750 for enriching an isolated collection at update time and at query time. At operation 752, an isolated collection is accesses or otherwise obtained. A ruleset for the isolated collection is received or accessed at operation 754. At optional operation 756, a processing time threshold may be set. The processing time threshold is an amount of time that may be used to distinguish between rules that are considered to take a "long" amount of time versus rules that take a "short" amount of time. At operation 758, a first subset of rules in the ruleset having a longer processing time is determined. In some examples, operation 758 includes comparing a predicted processing time for each rule to the processing time threshold. If the predicted processing time for the rule exceeds the predicted processing time, the rule is included in the first subset. The first subset of rules may also be determined on a known or determined complexity factor for each of the particular rules. In an example, the complexity factor may be based on the type of rule. For instance, transitive rules generally have higher complexity factors than some other rule types. The complexity factor may also be used to determine a predicted processing time for a particular rule. For instance, the complexity factor and the size of the isolated collection may be used to generate a predicted processing time for a particular rule. Additionally, in some examples, more simple rules may take longer execute across an entire isolated collection. For instance, if a simple rule is likely to generate at least one inferred relationship for every asserted resource, the processing time for that rule is likely to be longer for larger isolated collections. In such examples, the processing time may be estimated based on the size of the isolated collection and the breadth of the impact of the particular rule. At operation 760, a second subset of rules in the ruleset having a shorter processing time is determined. For instance, like operation 758, operation 760 may include comparing a predicted processing time for each rule to the processing time threshold. If the predicted processing time for the rule is less than the predicted processing time, the rule is included in the second subset. In some examples, all the rules that are not included in the first subset in operation 758 are automatically included in the second subset at operation 760. In other examples, rules may be classified based on their rule type and associated processing times. For instance, all rules belonging to a certain class may be placed in the first subset while another class of rules may be placed into the second subset. As an example, transitive rules generally require additional processing time and all transitive rules may be placed into the first subset.

At operation 762, the first subset of rules is executed at update time to generate inferred data including one or more inferred relationship. Update time occurs when a change or update is made to the isolated collection, including a first time accessing an isolated collection where none of the rules in the ruleset have been executed against the isolated collection. The inferred data generated at operation 762 is stored in the isolated collection.

At operation 764, a query is received for data within the isolated collection. Upon receiving the query, e.g., query time, the second subset of rules is executed against the isolated collection to generate additional inferred data at operation 766. The additional inferred data may either be permanently stored in the isolated collection or may be temporarily cached for a time to allow for execution of the query. At operation 768, the query is executed against the enriched isolated collection to generated results to the query in operation 770. The results may include asserted data as well as inferred data generated from the first subset of rules and/or the second subset rules. As should be appreciated, while the methods depicted in FIGS. 7A-7C discuss the utilization of two isolated collections and two rulesets, the methods are capable of handling many additional isolated collections and rulesets to enrich each of those datasets and provide query results.

Figure 8A:
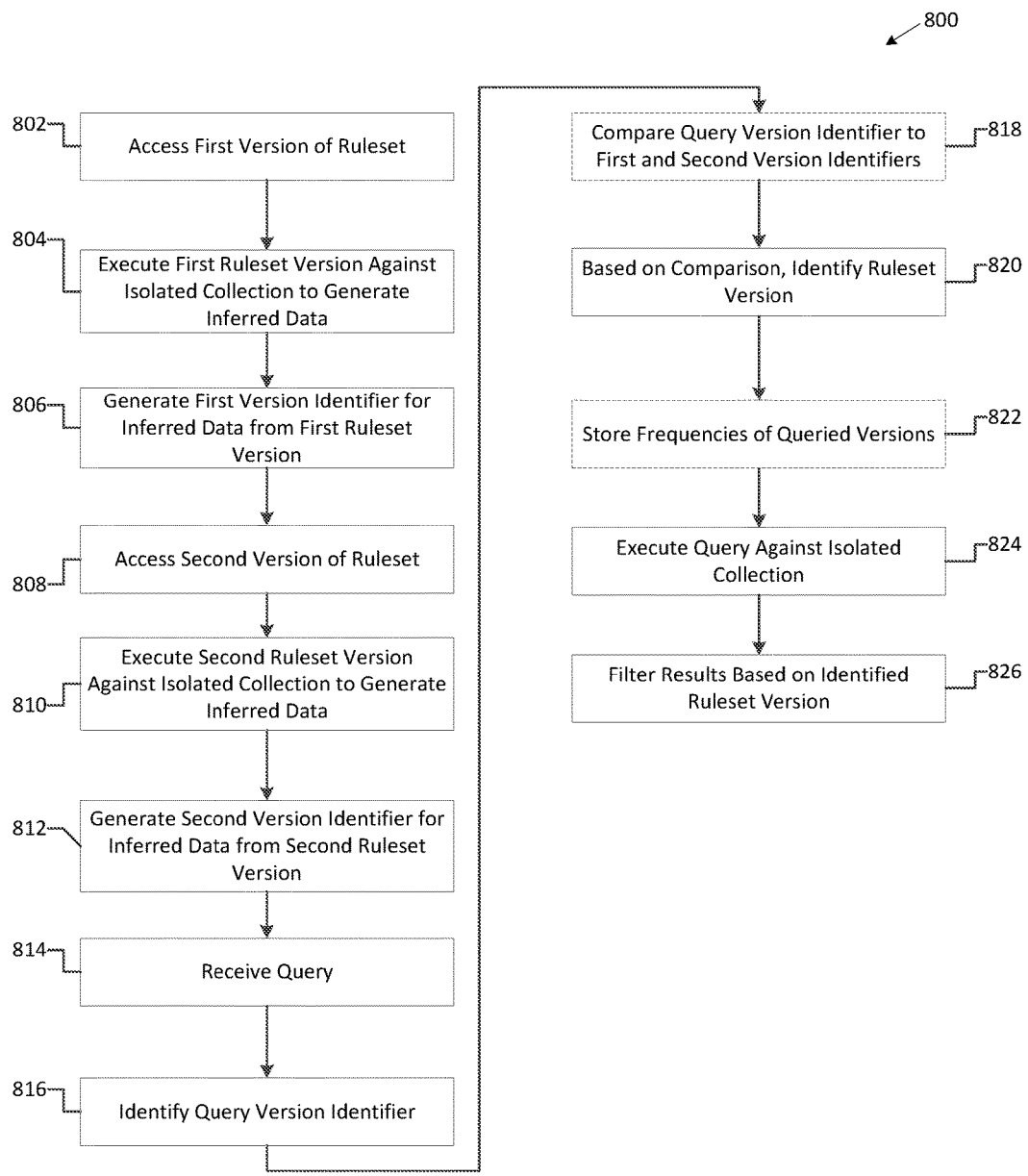
FIG. 8A depicts a method for enriching data with multiple versions of rulesets in an isolated collection of resources and relationships prior to receiving a query.

FIG. 8A depicts a method 800 for enriching data with multiple versions of rulesets in an isolated collection of resources and relationships prior to receiving a query. At operation 802 a first version of a ruleset is accessed or received. The ruleset may have been selected or entered by a developer user interface, as discussed above. The first version of the ruleset is then executed against an isolated collection to generate a first plurality of inferred data, such as inferred relationships between the asserted resources, at operation 804. At operation 806, a first version identifier is then generated for each of the inferred relationships created in operation 804. That first version identifier is incorporated into each of those inferred relationships. In some examples, the first version identifier may be stored as metadata for the relationship, included directly in the name of the relationship, or incorporated into the inferred relationship in some other manner. The first version identifier may be a version number of the ruleset, e.g., "v1", that was executed or it may also be a name for a particular version of a ruleset. In other examples, the version indicator may be a timestamp indicating when the inferred relationship was created.

At operation 808, a second version of the ruleset is accessed or received. At operation 810, the second version of the ruleset may then be executed against the isolated collection to generate a second plurality of inferred data, such as inferred relationships between the asserted resources. At operation 812, a second version identifier is then generated for each of the inferred relationships created in operation 810. That second version identifier is incorporated into each of those inferred relationships. In some examples, the second version identifier may be stored as metadata for the relationship, included directly in the name of the relationship, or incorporated into the inferred relationship in some other manner. Like the first version identifier, the second version identifier may be a version number of the ruleset, e.g., "v1", that was executed or it may also be a timestamp for when the inferred relationship was created.

A query for data within the isolated collection is then received at operation 814. The query may be received in a multitude of different forms, such as a Hypertext Transfer Protocol (HTTP) query, a JavaScript Object Notation (JSON) query, a field on a gPRC call, a portion of YAML or extensible markup language (XML) request, URI segments, and URI portions, among other possibilities. The query is parsed at operation 816 to determine a query version identifier. Where the query is received as an HTTP or JSON query, the query version identifier may be included as part of an HTTP header or JSON parameter, respectively. The query version identifier may be a ruleset version number. In other examples, the query version identifier may be an application programming interface (API) version. At operation 818, the query version identifier is compared to the first and second version identifiers. Where the query version identifiers and the first and second version identifiers are the version number of the ruleset, the comparison is straight forward. The version identifier that matches the query version identifier is identified in operation 820. Where the query version indicator is an API version number, a ruleset version that is supported under that API version is first determined and compared to the first and second version identifiers. The matching ruleset version is then identified. In some examples, such as where the query version identifier is the ruleset version itself or an API version, the comparison operation 818 may not need to be performed. Where the first and second version identifiers are time stamps, the time stamp may first need to be associated with the last time each rule set was executed against the isolated collection. Based on the execution history of the rule sets, the corresponding ruleset version that resulted in the creation of the particular inferred relationship may then be determined. The query version identifier may then be compared to that determined ruleset version.

At optional operation 822, the identified ruleset version for each received query may be recorded or otherwise stored to determine the frequency that inferred data for each ruleset version is being requests. Statistics regarding the frequency of requested rule versions may then be generated and used to deprecate particular rule versions. For example, if a particular ruleset version is being requested in less than 5% of queries, that ruleset version and any corresponding APIs or application requiring that ruleset version may be deprecated, and users may then be forced to upgrade to a newer API or application to continue using the service and accessing the isolated collection.

At operation 824, the query is executed against the isolated collection to generate results to the query. At operation 826, the results of the query are filtered based on the ruleset version identified in operation 820. For example, results to the query may initially include inferred relationships generated by both the first ruleset version and the second ruleset version. Upon filtering the results, inferred relationships from only the correct ruleset version are returned as results to the query. The query results may be displayed as a graph with nodes representing the resource identifiers and edges representing the relationships.

Figure 8B:
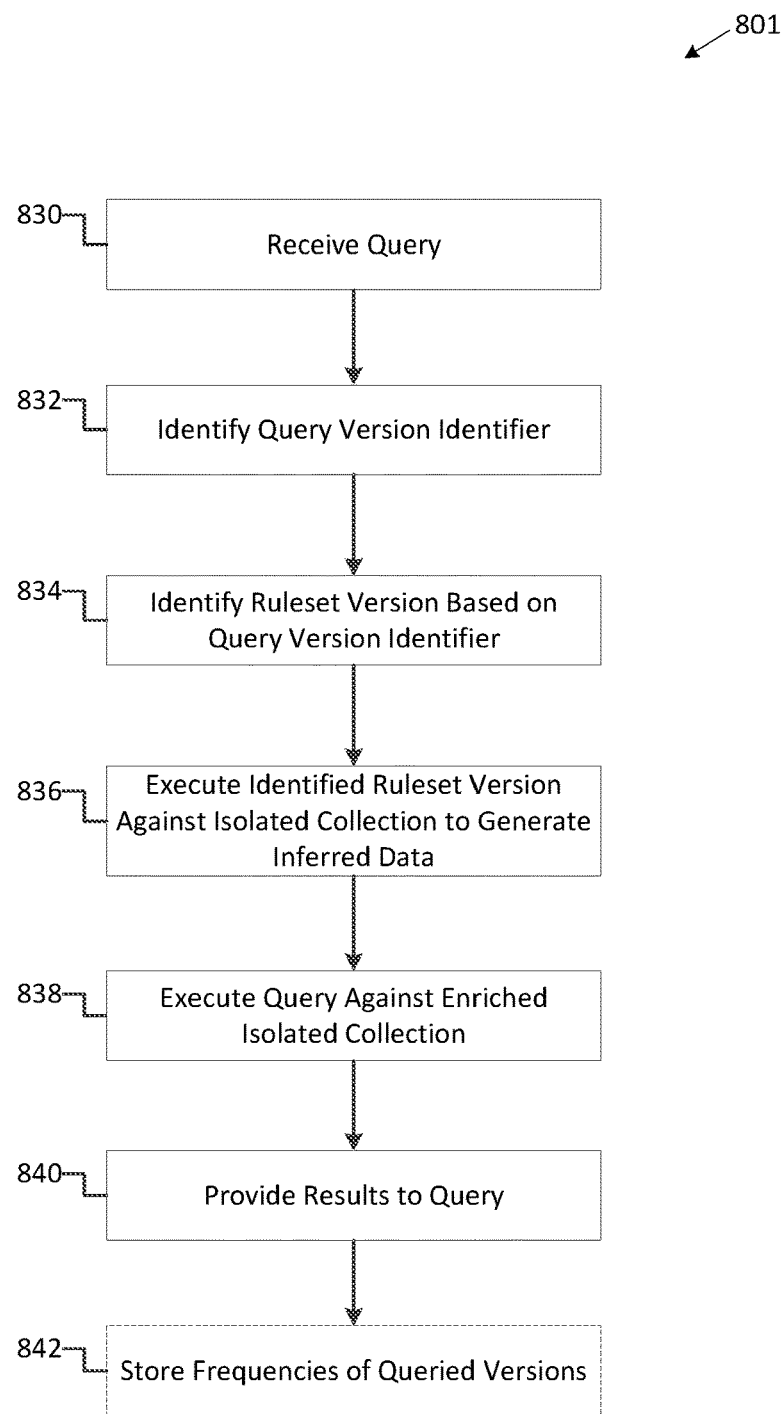
FIG. 8B depicts a method for enriching data with multiple versions of rulesets in an isolated collection of resources and relationships upon receiving a query.

FIG. 8B depicts a method 801 for enriching data with multiple versions of rulesets in an isolated collection of resources and relationships upon receiving a query. Method 801 is similar to method 800 depicted in FIG. 8A. However, in method 801, the versions of the ruleset may not have been executed against the isolated collection prior to the query being received. At operation 830, a query is received for data in an isolated collection. The query is parsed at operation 832 to determine a query version identifier. As discussed above, the query version identifier may be the ruleset version number itself or an API version number, and the query version identifier may be included as part of an HTTP header or JSON parameter. At operation 834, the ruleset version requested by the query is determined. Where the query version identifier is the ruleset version number itself, then that version number is identified in operation 834. If the query version identifier is the API version number, a ruleset version number that is supported under that API is then identified. The identified ruleset version is then executed against the isolate collection at operation 836 to generate inferred data, such as inferred relationships between asserted resources in the isolated collection, to create an enriched isolated collection. The query is then executed against the enriched isolated collection at operation 838 and the results to the query are provided in operation 840. Accordingly, any inferred data in the results to the query includes only inferred data resulting from the ruleset version identified in the query. Like the other query results discussed herein, the results to the query may be displayed as a graph with nodes representing the resource identifiers and edges representing the relationships.

FIGS. 9-12 and the associated descriptions provide a discussion of a variety of operating environments in which aspects of the technology may be practiced. However, the devices and systems illustrated and discussed with respect to FIGS. 9-12 are for purposes of example and illustration and are not limiting of a vast number of computing device configurations that may be utilized for practicing aspects of the disclosure, described herein.

Figure 9:
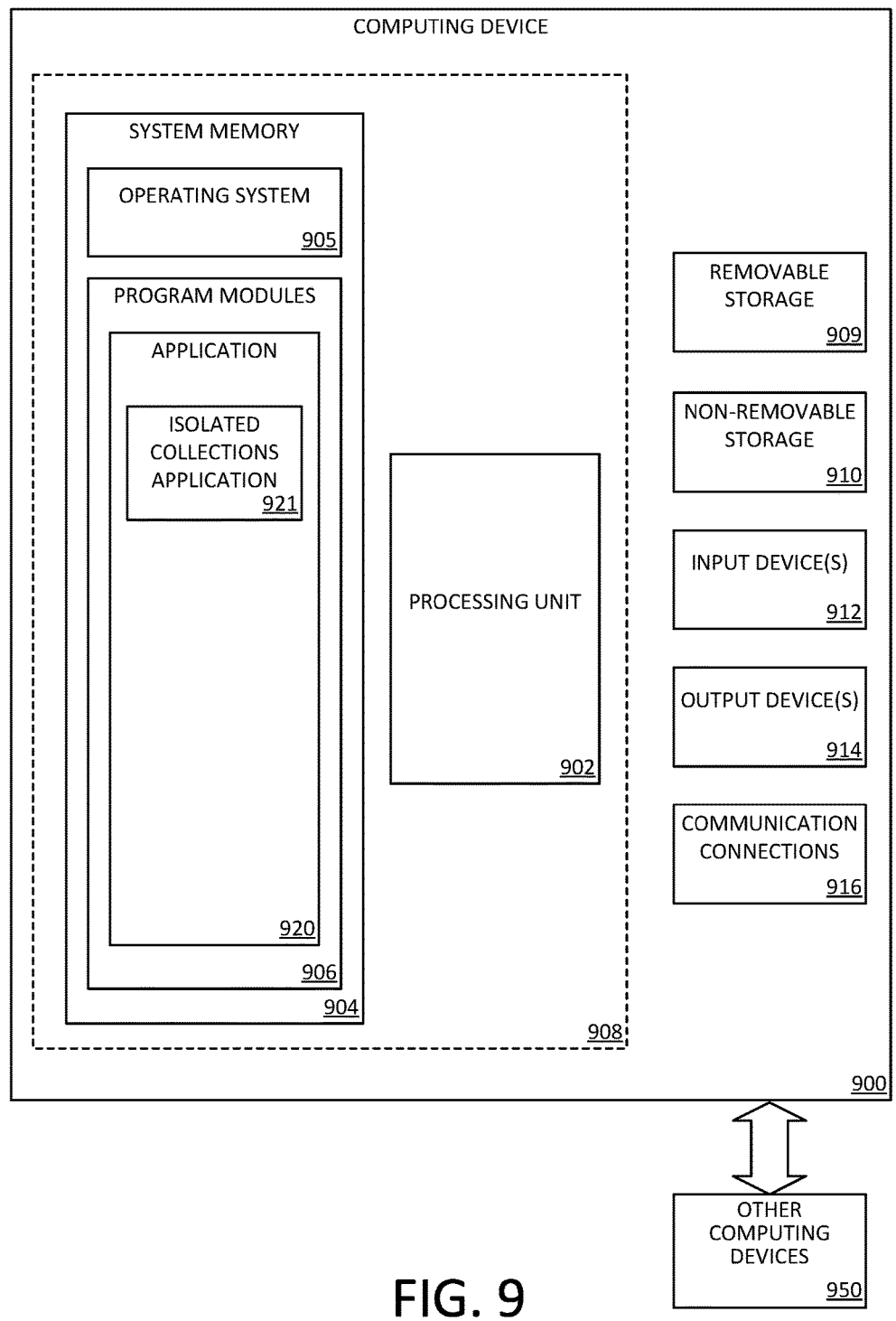
FIG. 9 depicts a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices described above, including the client computing devices 102A-C and the server computing devices 106A-C. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software application 920, such as one or more components supported by the systems described herein. As examples, system memory 804 may store isolated collection data (e.g., resource identifiers, resource metadata, relationship information, asserted/inferred relationships, graphical mapping information, query data, rule sets, such as, for example, inference rules, authorization information, authentication information, etc.) and instructions for managing versions of rulesets and enriching isolated collections. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., applications 920, such as isolated collection application 921) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
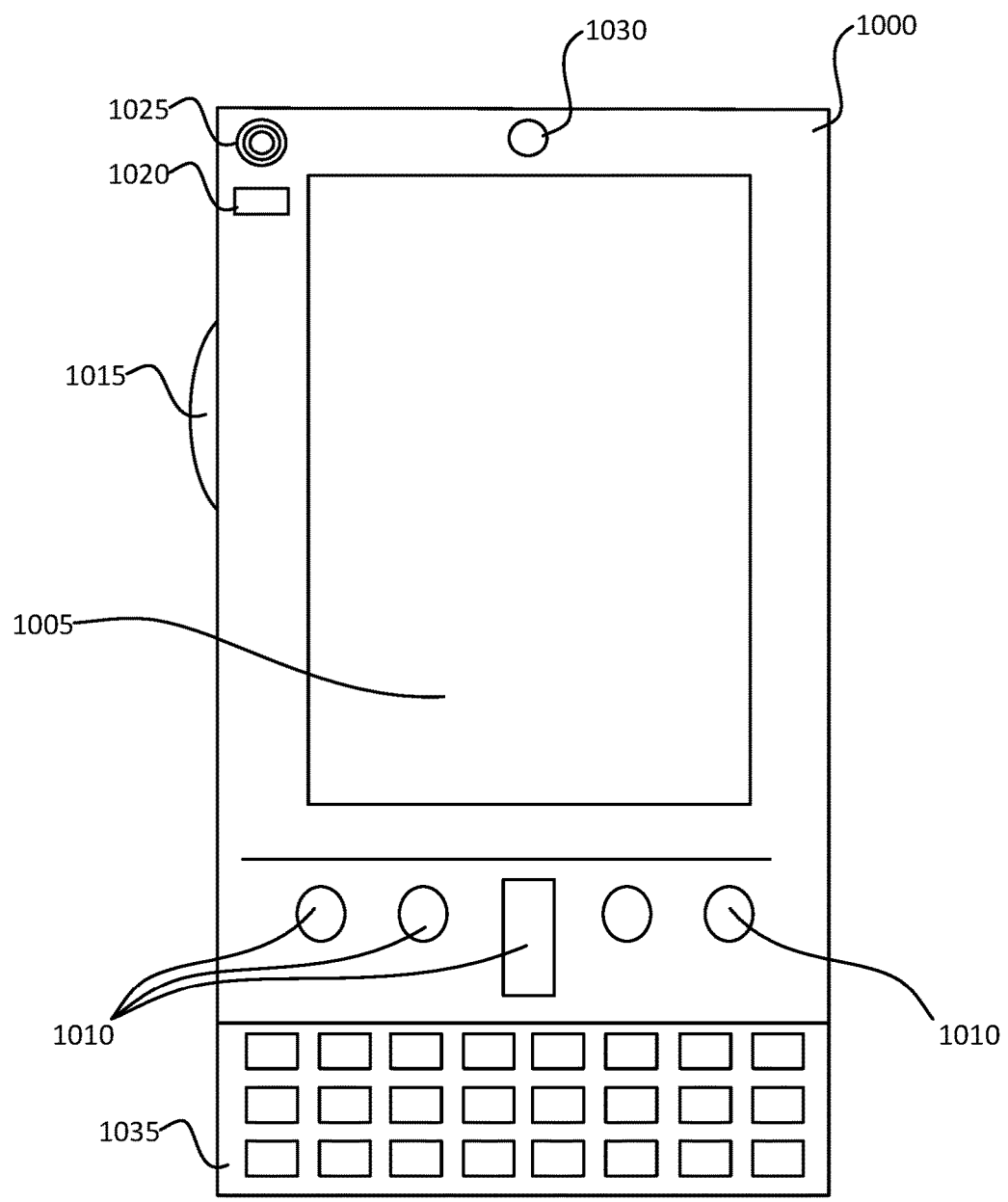
FIGS. 10A and 10B depicts simplified block diagrams of a mobile computing device with which aspects of the present disclosure may be practiced.
Figure 10B:
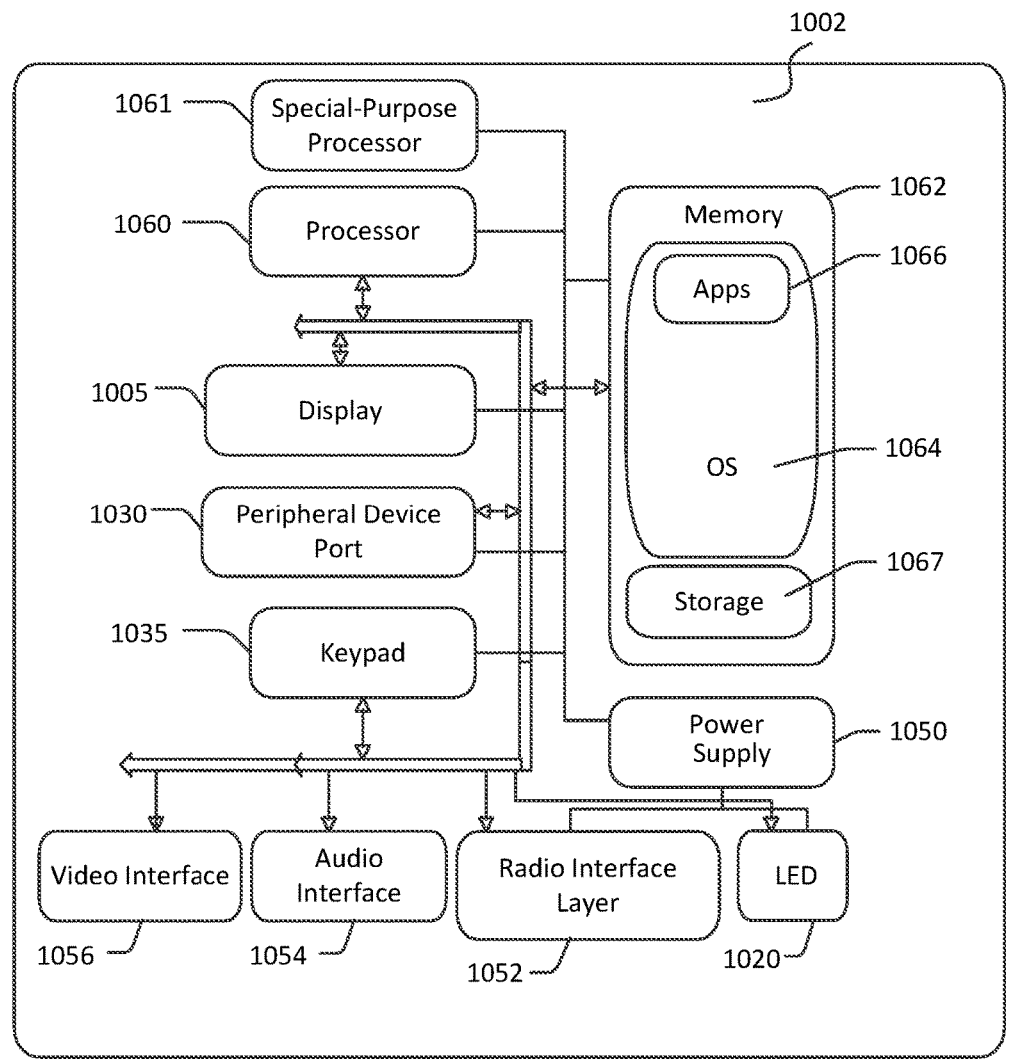

FIGS. 10A and 10B illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though processor(s) (e.g., processor 960 and/or special-purpose processor 961) and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
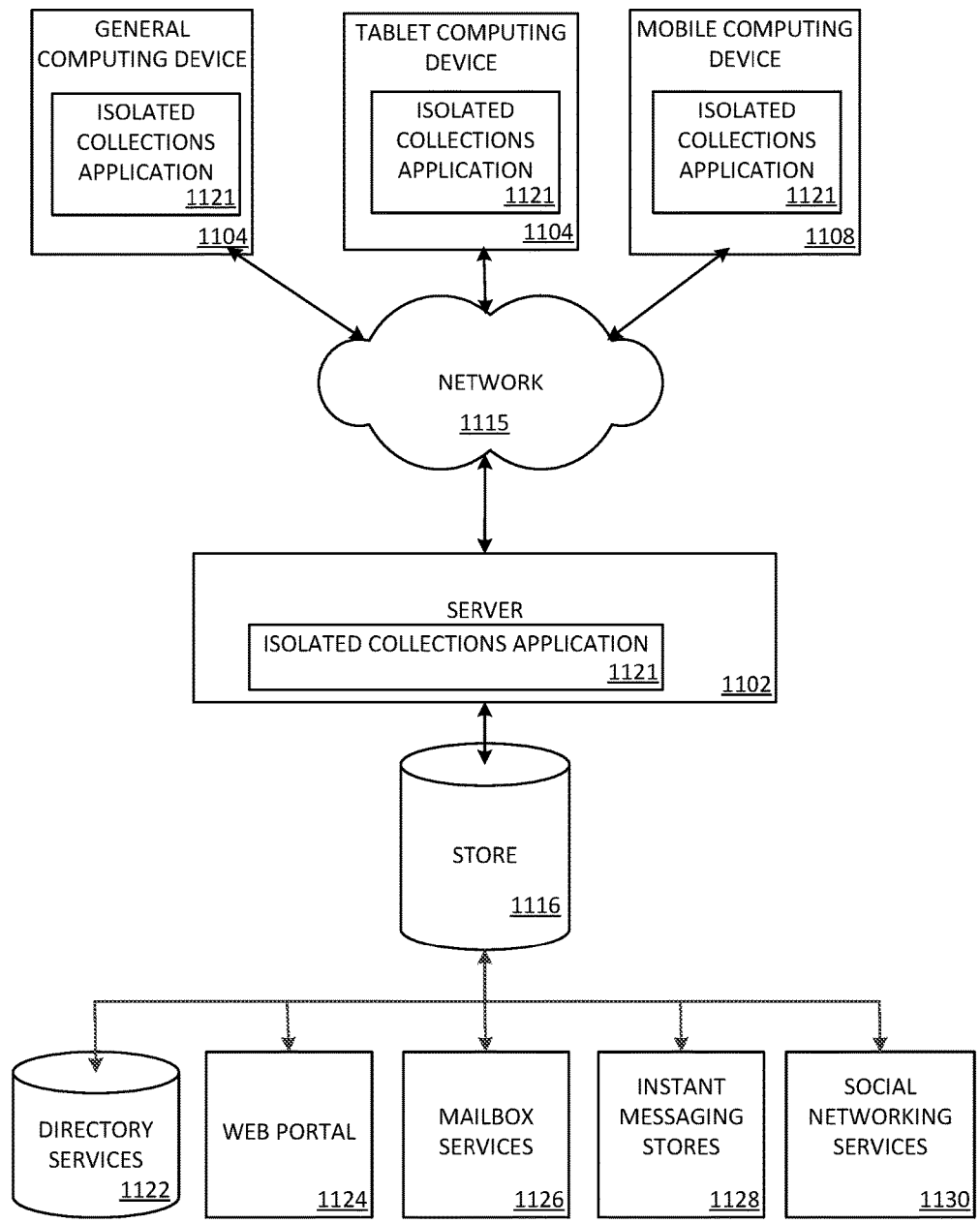
FIG. 11 depicts a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. An isolated collections application 1121 may be employed by a client that communicates with server device 1002, and/or the isolated collections application 1120 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Figure 12:
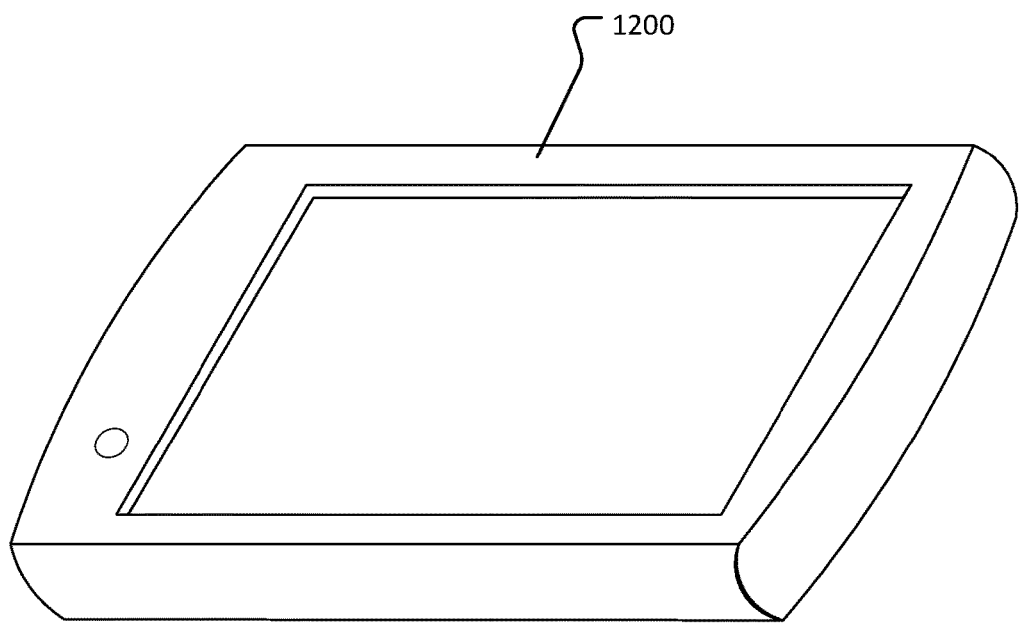
FIG. 12 depicts a tablet computing device for executing one or more aspects of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be appreciated from the foregoing discussion, in one aspect, the technology relates to a system comprising at least one processor; and a memory storing instructions that when executed by the at least one processor perform a set of operations comprising: accessing an isolated collection of asserted resources and asserted relationships between the asserted resources; accessing a first version of a ruleset for the isolated collection, wherein one or more rules in the ruleset are based on values of the asserted relationships; executing the first version of the ruleset against the isolated collection to generate a first plurality of inferred relationships between the asserted resources in the isolated collection; generate a first version identifier for each inferred relationship within the first plurality, wherein the version identifier indicates the first version of the ruleset; receiving a second version of the ruleset for the isolated collection; executing the second version of the ruleset against the isolated collection to generate a second plurality of inferred relationships between the asserted resources in the isolated collection; and generating a second version identifier for each inferred relationship within the first plurality, wherein the version identifier indicates the first version of the ruleset. In an example, the first version identifier is one of a ruleset version number or at least a portion of a name of the ruleset. In another example, the operations further comprise: receiving a query against the isolated collection; parsing the query to extract a query version identifier; processing the query against the isolated collection to generate results to the query; based on the query version identifier, identifying a version of the ruleset corresponding to the query; and filtering the results based on the identified version such that any inferred relationships included in the results were produced by processing the identified version of the ruleset. In yet another example, the operations further comprise displaying the filtered results as a graph showing each of the asserted resources as nodes within the graph and each of the asserted and inferred relationships as edges between the nodes. In still yet another example, the query version indicator is one of an application program interface (API) version number, a ruleset version number, or at least a portion of a ruleset version name.

In another example, the query version identifier is received as a part of a Hypertext Transfer Protocol (HTTP) header or a JavaScript Object Notation (JSON) parameter. In yet another example, the first version identifier is stored as metadata of the respective inferred relationship.

In another aspect, the technology relates to a computer-implemented method for handling versioning of rulesets, the method comprising: accessing an isolated collection comprising at least two or more asserted resources and one or more relationships between the asserted resources; accessing a first version of a ruleset for the isolated collection, wherein one or more rules in the ruleset are based on values of the asserted relationships; executing the first version of the ruleset against the isolated collection to generate a first plurality of inferred relationships between the asserted resources in the isolated collection; generate a first version identifier for each inferred relationship within the first plurality, wherein the version identifier indicates the first version of the ruleset; receiving a second version of the ruleset for the isolated collection; executing the second version of the ruleset against the isolated collection to generate a second plurality of inferred relationships between the asserted resources in the isolated collection; and generating a second version identifier for each inferred relationship within the first plurality, wherein the version identifier indicates the first version of the ruleset. In an example, the first version identifier is one of a ruleset version number or at least a portion of a name the first version of the ruleset. In another example, the method further comprises: receiving a query against the isolated collection; parsing the query to extract a query version identifier; executing the query against the isolated collection to generate results to the query; comparing the query version identifier to the first version identifier and the second version identifier; based on the comparison, identifying a version of the ruleset corresponding to the query; and filtering the results based on the identified version such that any inferred relationships included in the results were produced by executing the identified version of the ruleset. In yet another examples, the method further comprises displaying the filtered results as a graph showing each of the asserted resources as nodes within the graph and each of the asserted and inferred relationships as edges between the nodes. In still yet another example, the query version indicator is one of an application program interface version number, a ruleset version number, or a ruleset version name.

In another example, the query version identifier is received as a part of a Hypertext Transfer Protocol (HTTP) header or a JavaScript Object Notation (JSON) parameter. In yet another example, the first version identifier is stored as metadata of the respective inferred relationship.

In yet another aspect, the technology relates to a computer-implemented method for handling versioning of rulesets, the method comprising: receiving a query against an isolated collection of asserted resources and asserted relationships between the asserted resources; parsing the query to extract a query version identifier; based on the query version identifier, selecting a version of a ruleset to process against the isolated collection; executing the query by processing the selected version of the ruleset against the isolated collection to generate a plurality of inferred relationships between the asserted resources in the isolated collection; and returning results of the query, wherein the results of the query include at least a portion of the asserted resources and the inferred relationships. In an example, the method further comprises displaying the results as a graph showing the asserted resources as nodes within the graph and the inferred relationships as edges between the nodes. In another example, the query version identifier is included as a part of a Hypertext Transfer Protocol (HTTP) header or a JavaScript Object Notation (JSON) parameter. In yet another example, the query version indicator is one of an application program interface (API) version number, a ruleset version number, or a ruleset version name. In still yet another example, the method further comprises recording the frequency of a value of the query version indicator for the query and subsequent queries in a frequency metric dataset. In another example, the method further comprises caching the inferred relationships in the isolated collection for a period of time to complete execution of the query.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Further, while multiple examples have been discussed herein, features of each examples are generally combinable with features of other examples. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system comprising:
at least one processor; and
a memory storing instructions that when executed by the at least one processor perform a set of operations comprising:
accessing an isolated collection of asserted resources and asserted relationships between the asserted resources;
accessing a first version of a ruleset for the isolated collection, wherein one or more rules in the ruleset are based on values of the asserted relationships;
executing the first version of the ruleset against the isolated collection to generate a first plurality of inferred relationships between the asserted resources in the isolated collection;
generate a first version identifier for each inferred relationship within the first plurality, wherein the version identifier indicates the first version of the ruleset;
receiving a second version of the ruleset for the isolated collection;

executing the second version of the ruleset against the isolated collection to generate a second plurality of inferred relationships between the asserted resources in the isolated collection; and generating a second version identifier for each inferred relationship within the first plurality, wherein the version identifier indicates the first version of the ruleset.

2. The system of claim 1, wherein the first version identifier is one of a ruleset version number or at least a portion of a name of the ruleset.

3. The system of claim 1, wherein the operations further comprise:

receiving a query against the isolated collection;
parsing the query to extract a query version identifier;
processing the query against the isolated collection to generate results to the query;
based on the query version identifier, identifying a version of the ruleset corresponding to the query; and
filtering the results based on the identified version such that any inferred relationships included in the results were produced by processing the identified version of the ruleset.

4. The system of claim 3, wherein the operations further comprise displaying the filtered results as a graph showing each of the asserted resources as nodes within the graph and each of the asserted and inferred relationships as edges between the nodes.

5. The system of claim 3, wherein the query version indicator is one of an application program interface (API) version number, a ruleset version number, or at least a portion of a ruleset version name.

6. The system of claim 3, wherein the query version identifier is received as a part of a Hypertext Transfer Protocol (HTTP) header or a JavaScript Object Notation (JSON) parameter.

7. The system of claim 1, wherein the first version identifier is stored as metadata of the respective inferred relationship.

8. A computer-implemented method for handling versioning of rulesets, the method comprising:

accessing, by at least one processor, an isolated collection comprising at least two or more asserted resources and one or more relationships between the asserted resources;
accessing a first version of a ruleset for the isolated collection, wherein one or more rules in the ruleset are based on values of the asserted relationships;
executing the first version of the ruleset against the isolated collection to generate a first plurality of inferred relationships between the asserted resources in the isolated collection;
generate a first version identifier for each inferred relationship within the first plurality, wherein the version identifier indicates the first version of the ruleset;
receiving a second version of the ruleset for the isolated collection;
executing the second version of the ruleset against the isolated collection to generate a second plurality of inferred relationships between the asserted resources in the isolated collection; and
generating a second version identifier for each inferred relationship within the first plurality, wherein the version identifier indicates the first version of the ruleset.

9. The computer-implemented method of claim 8, wherein the first version identifier is one of a ruleset version number or at least a portion of a name the first version of the ruleset.

10. The computer-implemented method of claim 8, further comprising:

receiving a query against the isolated collection;
parsing the query to extract a query version identifier;
executing the query against the isolated collection to generate results to the query;
comparing the query version identifier to the first version identifier and the second version identifier;
based on the comparison, identifying a version of the ruleset corresponding to the query; and
filtering the results based on the identified version such that any inferred relationships included in the results were produced by executing the identified version of the ruleset.

11. The computer-implemented method of claim 10, further comprising displaying the filtered results as a graph showing each of the asserted resources as nodes within the graph and each of the asserted and inferred relationships as edges between the nodes.

12. The computer-implemented method of claim 10, wherein the query version indicator is one of an application program interface version number, a ruleset version number, or a ruleset version name.

13. The computer-implemented method of claim 10, wherein the query version identifier is received as a part of a Hypertext Transfer Protocol (HTTP) header or a JavaScript Object Notation (JSON) parameter.

14. The computer-implemented method of claim 8, wherein the first version identifier is stored as metadata of the respective inferred relationship.

15. A computer-implemented method for handling versioning of rulesets, the method comprising:

receiving, by at least one processor, a query against an isolated collection of asserted resources and asserted relationships between the asserted resources;
parsing the query to extract a query version identifier;
based on the query version identifier, selecting a version of a ruleset to process against the isolated collection;
executing the query by processing the selected version of the ruleset against the isolated collection to generate a plurality of inferred relationships between the asserted resources in the isolated collection; and
returning results of the query, wherein the results of the query include at least a portion of the asserted resources and the inferred relationships.

16. The computer-implemented method of claim 15, further comprising displaying the results as a graph showing the asserted resources as nodes within the graph and the inferred relationships as edges between the nodes.

17. The computer implemented method of claim 15, wherein the query version identifier is included as a part of a Hypertext Transfer Protocol (HTTP) header or a JavaScript Object Notation (JSON) parameter.

18. The computer-implemented method of claim 15, wherein the query version indicator is one of an application program interface (API) version number, a ruleset version number, or a ruleset version name.

19. The computer-implemented method of claim 15, further comprising recording the frequency of a value of the query version indicator for the query and subsequent queries in a frequency metric dataset.

20. The computer-implemented method of claim 15, further comprising caching the inferred relationships in the isolated collection for a period of time to complete execution of the query.

* * * * *